US011956505B2

(12) United States Patent
Mountain

(10) Patent No.: US 11,956,505 B2
(45) Date of Patent: *Apr. 9, 2024

(54) APPARATUS, SYSTEMS AND METHODS FOR SYNCHRONIZING CALENDAR INFORMATION WITH ELECTRONIC PROGRAM GUIDE INFORMATION

(71) Applicant: DISH Technologies L.L.C., Englewood, CO (US)

(72) Inventor: Dale Mountain, Silsden (GB)

(73) Assignee: DISH Technologies L.L.C., Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/845,620

(22) Filed: Jun. 21, 2022

(65) Prior Publication Data

US 2022/0321957 A1    Oct. 6, 2022

Related U.S. Application Data

(63) Continuation of application No. 16/653,405, filed on Oct. 15, 2019, now Pat. No. 11,395,040, which is a (Continued)

(51) Int. Cl.
*H04N 21/458* (2011.01)
*G06Q 10/1093* (2023.01)
(Continued)

(52) U.S. Cl.
CPC ..... *H04N 21/4583* (2013.01); *G06Q 10/1095* (2013.01); *H04N 21/4316* (2013.01); *H04N 21/44213* (2013.01); *H04N 21/4821* (2013.01); *H04N 21/4882* (2013.01); *H04N 5/782* (2013.01); *H04N 21/4334* (2013.01)

(58) Field of Classification Search
CPC .......... H04N 21/4583; H04N 21/4316; H04N 21/44213; H04N 21/4821; H04N 21/4882; H04N 21/4334; G06Q 10/1095
See application file for complete search history.

(56) References Cited

U.S. PATENT DOCUMENTS 6,266,814 B1   7/2001   Lemmons et al.
6,369,840 B1   4/2002   Barnett et al.
(Continued)

FOREIGN PATENT DOCUMENTS

EP       1168835 A2      1/2002
JP    H10112087 A      4/1998
(Continued)

*Primary Examiner* — Mulugeta Mengesha
(74) *Attorney, Agent, or Firm* — Perkins Coie LLP

(57) ABSTRACT

Systems and methods of media devices are operable to receive appointment information from an electronic device, wherein the appointment information is defined by a time period for a scheduled appointment for a user, and wherein the scheduled appointment requires the user to be at a remote location that is remote from a location of the media device such that the user is unable to manually operate or use their media device. The media device is configured to automatically modify at least one operation of the media device based on the received appointment information that is associated with the scheduled appointment.

17 Claims, 6 Drawing Sheets

Related U.S. Application Data continuation of application No. 16/043,037, filed on Jul. 23, 2018, now Pat. No. 10,484,739, which is a continuation of application No. 14/444,320, filed on Jul. 28, 2014, now Pat. No. 10,034,052.

(51) Int. Cl.
*H04N 21/431* (2011.01)
*H04N 21/442* (2011.01)
*H04N 21/482* (2011.01)
*H04N 21/488* (2011.01)
*H04N 5/782* (2006.01)
*H04N 21/433* (2011.01)

(56) References Cited

U.S. PATENT DOCUMENTS

| | | | |
|---|---|---|---|
| 6,430,359 B1 | 8/2002 | Yuen et al. | |
| 6,532,589 B1 | 3/2003 | Proehl et al. | |
| 6,636,888 B1 | 10/2003 | Bookspan et al. | |
| 6,675,356 B1 | 1/2004 | Adler et al. | |
| 6,742,184 B1 | 5/2004 | Finseth et al. | |
| 7,516,470 B2 * | 4/2009 | Russ | H04N 21/4112 725/40 |
| 10,034,052 B2 | 7/2018 | Mountain | |
| 10,484,739 B2 | 11/2019 | Mountain | |
| 2002/0049620 A1 | 4/2002 | Uchida et al. | |
| 2002/0196280 A1 | 12/2002 | Bassett et al. | |
| 2003/0031465 A1 | 2/2003 | Blake | |
| 2003/0086694 A1 | 5/2003 | Davidsson | |
| 2006/0117349 A1 | 6/2006 | Ruhl | |
| 2008/0141145 A1 | 6/2008 | Klausmeier | |
| 2008/0273856 A1 * | 11/2008 | Bumgardner | H04N 5/782 386/292 |
| 2011/0016492 A1 | 1/2011 | Morita | |
| 2011/0184768 A1 * | 7/2011 | Norton | G06Q 10/02 705/5 |
| 2013/0104170 A1 * | 4/2013 | Su | H04N 21/4316 725/40 |
| 2013/0187957 A1 * | 7/2013 | Andersson Reimer | G06F 8/38 345/672 |
| 2013/0329527 A1 | 12/2013 | Alavala et al. | |
| 2013/0330063 A1 | 12/2013 | Bonovich et al. | |
| 2014/0068692 A1 | 3/2014 | Archibong et al. | |
| 2014/0157312 A1 | 6/2014 | Williams et al. | |
| 2014/0270713 A1 | 9/2014 | Hybertson | |
| 2014/0365107 A1 * | 12/2014 | Dutta | G01C 21/343 701/538 |
| 2015/0016803 A1 | 1/2015 | Clevenger | |
| 2020/0045372 A1 | 2/2020 | Mountain | |

FOREIGN PATENT DOCUMENTS

| | | |
|---|---|---|
| JP | 2000278639 A | 10/2000 |
| JP | 2000358283 A | 12/2000 |
| WO | 0189206 A2 | 11/2001 |

\* cited by examiner

SELECT ELECTRONIC DEVICES FOR CALENDAR SYNCRONIZATION

- [x] SMART PHONE 104A
- [x] DESKTOP COMPUTER 104B
- [ ] LAPTOP COMPUTER 104C
- [ ] ELECTRONIC DEVICE 104E
- [ ] _____

THERE MAY BE A POTENTIAL CONFLICT WITH THE FOLLOWING
SCHEDULED APPOINTMENT: ← 702

APPOINTMENT TIME: 8:30 – 10:00 P.M.
APPOINTMENT DATE: APRIL 8, 2014

| CHANNEL | EVENT TITLE | SCHEDULED PRESENTATION TIMES |
|---|---|---|
| ☐ STATION A | PROGRAM A-1 | 8:00 P.M. TO 10:00 P.M. |
| ☐ STATION B | PROG B-1 | 8:00 P.M. TO 9:00 P.M. |
| ☐ STATION C | PROG C-1 | 8:00 P.M. TO 9:00 P.M. |
| ☐ STATION C | PROG C-2 | 9:00 P.M. TO 10:00 P.M. |
| ☐ ALL MEDIA CONTENT EVENTS | | |

IF YOU WOULD LIKE TO RECORD, PLEASE SELECT THE BOXES NEXT TO THE MEDIA CONTENT EVENTS THAT YOU WOULD LIKE TO AUTOMATICALLY RECORD, OR SELECT ALL MEDIA CONTENT EVENTS.

FIG. 7

THERE MAY BE A POTENTIAL CONFLICT WITH THESE USERS FOR THE
FOLLOWING SCHEDULED APPOINTMENTS:
← 802

| USER NAME | SCHEDULED APPOINTMENT DATE/TIMES | |
|---|---|---|
| ☒ USER 1 | JUNE 10, 2014 | 8:00 P.M. TO 10:00 P.M. |
| ☐ USER 1 | JUNE 18, 2014 | 8:00 P.M. TO 9:00 P.M. |
| ☐ USER 1 | JUNE 18, 2014 | 8:00 P.M. TO 9:00 P.M. |
| ☐ USER 2 | JUNE 12, 2014 | 9:00 P.M. TO 10:00 P.M. |
| ☐ USERS 1 AND 2 | JUNE 12, 2014 | 9:00 P.M. TO 10:00 P.M. |
| ☐ ALL USERS | | |

IF YOU WOULD LIKE TO RECORD, PLEASE SELECT THE BOXES NEXT TO THE MEDIA CONTENT EVENTS THAT YOU WOULD LIKE TO AUTOMATICALLY RECORD, OR SELECT ALL MEDIA CONTENT EVENTS.

FIG. 8

APPOINTMENT TIME: 8:30 – 10:00 P.M. ← 152
APPOINTMENT DATE: APRIL 8, 2014
CURRENT TIME: 4:00 P.M.

| CHANNEL | 8:00 P.M. | 9:00 P.M. | 10:00 P.M. | 11:00 P.M. | |
|---|---|---|---|---|---|
| STATION A | PROGRAM A-1 | | PROGRAM A-2 | PROG A-3 | |
| STATION B | PROG B-1 | PROG B-2 | PROGRAM B-3 | | |
| STATION C | PROG C-1 | PROG C-2 | PROG C-3 | PROG C-4 | PR |
| STATION D | PROGRAM D-1 | | PROGRAM D-2 | PROGRAM D-3 | |
| STATION E | PROGRAM E-1 | | | | |
| STATION F | PROG F-1 | PROGRAM F-2 | | | Pr |
| STATION G | PROG G-1 | PROG G-2 | PROG G-3 | PROG G-4 | PR |

Appointment
8:30 – 10:00 pm
902  150  904

First Time Adjustment Region
Second Time Adjustment Region

☒ TRAVEL TIME ADJUSTMENTS ← 906

SPECIFY TIME ADJUSTMENT PERIODS BY DURATION TO SCHEDULED APPOINTS INDICATED BELOW, OR SELECT BOX TO ENTER ONE HOUR DURATION TO BEGINNING OR END OF SCHEDULED APPOINTMENT TIMES

| BEGINNING | ENDING | SCHEDULED APPOINTMENT DATE/TIMES |
|---|---|---|
| ☒ _____ | ☒ _____ | JUNE 10, 2014  8:00 P.M. TO 10:00 P.M. |
| ☐ 15 MIN | ☐ 1 HOUR | JUNE 17, 2014  8:00 P.M. TO 9:00 P.M. |
| ☐ 25 MIN | ☐ _____ | JUNE 18, 2014  8:00 P.M. TO 9:00 P.M. |
| ☐ 8:45 p.m. | ☐ _____ | JUNE 19, 2014  9:00 P.M. TO 10:00 P.M. |
| ☐ _____ | ☐ _____ | JUNE 21, 2014  9:00 P.M. TO 10:00 P.M. |
| ☐ | ☐ | ALL SCHEDULED APPOINTMENTS ← 1008 |

APPARATUS, SYSTEMS AND METHODS FOR SYNCHRONIZING CALENDAR INFORMATION WITH ELECTRONIC PROGRAM GUIDE INFORMATION

PRIORITY CLAIM

This patent application is a Continuation of U.S. application Ser. No. 16/653,405, filed Oct. 15, 2019, entitled "APPARATUS, SYSTEMS AND METHODS FOR SYNCHRONIZING CALENDAR INFORMATION WITH ELECTRONIC PROGRAM GUIDE INFORMATION," and granted as U.S. Pat. No. 11,395,040 on Feb. 6, 2020, 2022, which is a Continuation of U.S. application Ser. No. 16/043,037, filed Jul. 23, 2018, entitled "APPARATUS, SYSTEMS AND METHODS FOR SYNCHRONIZING CALENDAR INFORMATION WITH ELECTRONIC PROGRAM GUIDE INFORMATION," and granted as U.S. Pat. No. 10,484,739 on Nov. 19, 2019, which is a Continuation of U.S. application Ser. No. 14/444,320, filed Jul. 28, 2014, entitled "APPARATUS, SYSTEMS AND METHODS FOR SYNCHRONIZING CALENDAR INFORMATION WITH ELECTRONIC PROGRAM GUIDE INFORMATION," and granted as U.S. Pat. No. 10,034,052 on Jul. 24, 2018, the contents of which are herein incorporated by reference in their entirety.

BACKGROUND

Electronic devices may contain an electronic calendar application to aid the user in managing their schedules. The electronic calendar application is an electronic version of a hardcopy calendar where the user manually writes information about appointments into the hardcopy calendar. With the electronic calendar application, information pertaining to user appointments may be entered or modified in a variety of manners, such as from a manual entry made by the user, a remote entry by another party, or from another remote electronic calendar application.

Additionally, the electronic calendar application may provide logic for other functions, such as, but not limited to, an appointment book, address book, and/or contact list. These functional tools are an extension of many of the features provided by time management software such as desk accessory packages and computer office automation systems. Calendaring is a standard feature of many electronic devices, such as, but not limited to, desktop computers, laptop computers, notebook computers, tablet computers, personal digital assistants (PDAs), enterprise digital assistants (EDAs), cell phones, smart phones, and smart watches (watches having a user input means). Electronic calendar applications may also be implemented in one or more components of a media presentation system, such as a media device that receives and presents content to the user.

The electronic calendar application may generate calendar graphics which resemble physical calendars. Such calendar graphics may show months, days, and/or time periods of a day. The generated calendar graphics are presented to the user, or to another viewer, on a display. The display may be a component of the electronic device, or may be a component of a display device that is communicatively coupled to the electronic device.

Further, the generated calendar graphics may indicate various types of appointments that the user has on their schedule. Calendar appointments may include various information to assist the user in understanding the nature of their appointment. For example, appointment information may include a defined time period for the scheduled appointment, such as the start date and start time of the appointment, and optionally a duration and/or end time of the appointment. The appointment information may include a textual description of the appointment, such as information describing the purpose, topic, subject matter of the appointment. The names of other parties that may be present at the appointment may be indicated. The address and/or other location information indicating where the appointment is to be held may be included in the appointment information. Contact information, such as the name of the location or a phone number, may also be included in the appointment information.

The electronic calendar application may be configured to generate appointment reminders which are communicated to or presented to the user. Such reminders are typically generated in advance of a scheduled appointment by one or more predefined durations, and/or may be generated at the time that the appointment is scheduled to start. For example, an audible tone may be emitted as the scheduled appointment start time approaches and/or arrives. Additionally, or alternatively, if the user is viewing the display, a pop-up type reminder may be presented to the user. Reminders may even be communicated from the device executing the electronic calendar application to another device that the user, or another person, may be using.

In many situations, the user may wish to perform other activities, either concurrently with the scheduled appointment or instead of the scheduled appointment. For example, the user may have wanted to be at their residence watching and/or listening to a media content event of interest on their media presentation system instead of attending the scheduled appointment. In many situations, the user may have realized the schedule conflict between the presentation times of the program event of interest and the start time and/or end time of the scheduled appointment, and may have therefore manually configured their media presentation system to automatically record the program event of interest for later viewing and/or listening. Unfortunately, in some situations, the user may not realize that there is a schedule conflict between the program event of interest and the scheduled appointment, and may forget or not know to schedule the media content event of interest for recording. In these situations, the media content event of interest may not be recorded for later viewing.

Accordingly, there is a need in the arts to improve the ability of a user to more efficiently and more reliably coordinate operation of their media presentation system with appointment information that is managed by one or more electronic calendar applications.

SUMMARY

Systems and methods of a media device are operable to receive appointment information from an electronic device, wherein the appointment information is defined by a time period for a scheduled appointment for a user, and wherein the scheduled appointment requires the user to be at a remote location that is remote from a location of the media device such that the user is unable to manually operate or use their media device. The media device is configured to automatically modify at least one operation of the media device based on the received appointment information that is associated with the scheduled appointment.

BRIEF DESCRIPTION OF THE DRAWINGS

Preferred and alternative embodiments are described in detail below with reference to the following drawings:

FIG. 7 illustrates an example GUI that may be presented on the display to a user to indicate identified conflicting media content events and an associated conflicting scheduled appointment;

FIG. 8 illustrates an example GUI that indicates identified conflicting media content events and the identity of the users who are associated with the conflicting media content events;

FIG. 9 illustrates an example EPG wherein travel time adjustments have been made to the times of the scheduled appointments shown by the presented EPG; and FIG. 10 illustrates an exemplary GUI that may be presented to the user to facilitate specification of travel time adjustments to one or more scheduled appointments.

DETAILED DESCRIPTION

Figure 1:
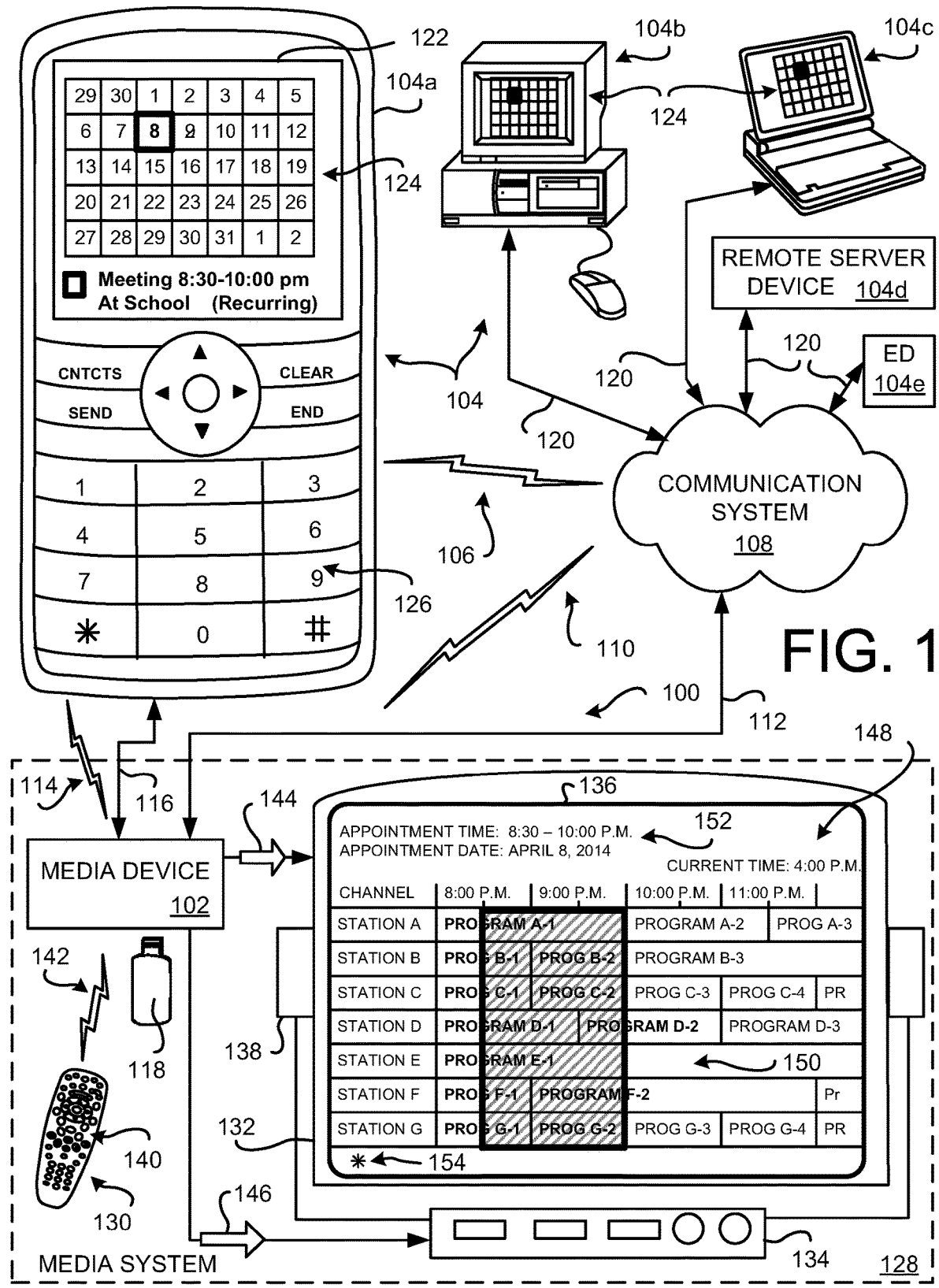
FIG. 1 is a block diagram of a communication environment that includes an exemplary media device with a calendar synchronization system in communication with a plurality of different types of media devices that are configured with electronic calendar applications.

FIG. 1 is a block diagram of a communication environment with a calendar synchronization system 100 provisioned in an exemplary media device 102 that receives and presents media content to a user. The media device 102 is in communication with a plurality of electronic devices 104 that are configured with electronic calendar applications. Embodiments of the calendar synchronization system 100 are configured to cause the media device 102 to receive appointment information from, and/or to exchange appointment information with, one or more of the electronic devices 104. The calendar synchronization system 100 is configured to automatically modify operation of the media device 102 based on received appointment information that is associated with a scheduled appointment.

Scheduled appointments may be made by the user for a variety of reasons. Of particular interest herein are scheduled appointments which require the user to be at a remote location such that the user is not able to manually operate and/or use their media device 102 for presentation of media content. Thus, if the user is unable to use their media device 102 because the scheduled appointment requires them to be at a remote location, then embodiments of the calendar synchronization system 100 automatically modify operation of the media device 102 based on received appointment information for that particular scheduled appointment. Accordingly, the phrase "remote location" is defined herein to be a location that is sufficiently remote from the media device 102 such that the user is unable to manually operate and/or use their media device 102 to view and/or record a media content event of interest.

For example, the media device 102 may reside at the residence of the user. Examples of scheduled appointments that require the user to be at a remote location include attendance at a business meeting, a school function, as social gathering, a vacation, a recreational outing, a recreational event, or the like. Here, attendance of the user at the remote location requires the user to be away from their residence.

As another example, the media device 102 may be in a media room, living room, recreational room or the like. The scheduled appointment that requires the user to be at a remote location could be a telephone conference wherein the user retreats to a different location in the residence, such as their home office or the like, to conduct the telephone conference. In these situations, the user is unable to manually operate and/or use their media device 102.

Exemplary electronic devices 104 illustrated in FIG. 1 include a smart phone 104*a*, a desktop computer 104*b*, a laptop computer 104*c*, a remote server device 104*d*, and electronic device 104*e*. Other electronic devices 104 (not shown) that may have electronic calendar applications include, but are not limited to, mobile media devices, notebook computers, tablet computers, notepads, netbooks, electronic book readers (e-books), personal digital assistants (PDAs), enterprise digital assistants (EDAs), cell phones, and smart watches. Electronic calendar applications may also be implemented in one or more components of a media presentation system, such as the exemplary media device 102.

Some calendar applications may not reside in the user's device that the user is using to maintain their calendar schedules. For example, the electronic device 104*e* may communicate input appointment information provided by the user or another authorized person into a calendar application residing in one or more of the example remote server devices 104*d*. In this type of calendar application system, referred to herein as a cloud calendar application system, a login and/or password are entered or provided to the electronic calendar application residing in the remote server devices 104*d* by the user or other authorized person. Here, embodiments are configured to emulate the user by providing a script or the like with login and/or password information such that the calendar synchronization system 100 is able to access the electronic calendar applications. Once the login and/or password information is provided and access is granted, embodiments of the calendar synchronization system 100 thereby gain access to the appointment information of the electronic calendar application residing at the remote server devices 104*d*.

Embodiments of the calendar synchronization system 100 electronically receive appointment information from the electronic calendar applications residing in one or more of the electronic devices 104. The received appointment information identifies scheduled appointments that have been specified by the user of one of the electronic calendar applications of one or more of the electronic devices 104. Embodiments of the calendar synchronization system 100 compare the received appointment information with other information residing in the media device 102, and based on the comparison, causes the media deice 102 to perform one or more automatic operations when the appointment information indicates that the user will not be able to use or manually operate the media device 102 (because their scheduled appointment requires that the user to be at a remote location).

An exemplary automatic operation performed by the media device 102 under the control of the calendar synchronization system 100 is an automatic scheduling for a recording of a media content event of interest that is scheduled for presentation in whole, or in part, during the same time period of a scheduled appointment. That is, during a time period that the appointment information from the electronic calendar application indicates that the user is required to be at a remote location that is away from the media device, or indicates that the user may be otherwise occupied during a scheduled appointment, a media content event of interest that is scheduled for presentation during a time that is coincident with the times of a scheduled appointment is automatically recorded. Here, the calendar synchronization system 100 compares at least the times associated with a scheduled appointment with presentation times of the media content event of interest. (Typically, the presentation time corresponds to the time that the media content event of interest is being received in a broadcasted media content stream at the media device 102.) Additionally, or alternatively, the media device 102 may perform other automatic operations, described in greater detail herein.

The example communication environment topography illustrated in FIG. 1 illustrates that the various electronic devices 104 with electronic calendar applications may be communicatively coupled to the media device 102 in a variety of manners. In an exemplary operating situation, the smart phone 104a establishes a radio frequency (RF) communication link 106 to a communication system 108. For example, a portion of the communication system 108 may comprise a cellular phone network. Once the communication link 106 has been established by the smart phone 104a, the appointment information associated with a scheduled appointment may be communicated to the media device 102 using any suitable medium, such as text messaging or the like.

For example, the resident electronic calendar application of an electronic device 104 may generate an alert message for the user that indicates information about the scheduled appointment (date, time, appointment purpose, etc.). The alert message may, for example, be textual information shown on a display. This textual information may be communicated to embodiments of the calendar synchronization system 100 for processing. Alternatively, or additionally, the electronic device 104 may communicate a text message that indicates information about the scheduled appointment that is received by the media device 102.

An RF communication link 110 is established between the communication system 108 and the media device 102 such that the smart phone 104a may communicate the appointment information from its electronic calendar application to the media device 102. Here, the RF communication link 110 may be a cellular phone type link. Alternatively, or additionally, the RF communication link 110 may be to a Wi-Fi system, a wireless modem, or the like.

Alternatively, or additionally, a physical connection 112 may communicatively couple the media device 102 to the communication system 108. For example, a portion of the communication system 108 may comprise the Internet, and the physical connection 112 may provide connectivity to the Internet or to another sub-system communicatively coupled to the Internet.

Accordingly, one skilled in the art understands that the communication system 108 may comprise one or more of a cellular telephone system, a radio frequency (RF) wireless system, a telephony system, the Internet, a Wi-fi system, a microwave communication system, a fiber optics system, an intranet system, a local access network (LAN) system, an Ethernet system, a cable system, a radio frequency system, a cellular system, an infrared system, a satellite system, or a hybrid system comprised of multiple types of communication media. Additionally, embodiments may be implemented to communicate using other types of communication technologies, such as but not limited to, digital subscriber loop (DSL), X.25, Internet Protocol (IP), Ethernet, Integrated Services Digital Network (ISDN) and asynchronous transfer mode (ATM). Also, embodiments may be configured to communicate over combination systems having a plurality of segments which employ different formats for each segment that employ different technologies on each segment.

In some situations, the electronic device 104 may be directly communicatively coupled to the media device 102. For example, FIG. 1 illustrates that the smart phone 104a is communicatively coupled to the media device via wireless link 114. Here, the smart phone 104a is configured to communicate using an RF type signal, an infrared type signal, or the like that is directly receivable by the media device 102. Alternatively, or additionally, a physical connector 116 may be used to physically couple the smart phone 104a to the media device 102. Alternatively, or additionally, a detachable memory medium 118, such as a memory stick or the like, may be used to transfer the appointment information from the electronic device 104 to the media device 102.

A variety of different types of electronic devices 104 may provide appointment information to the media device 102 from their respective electronic calendar applications via the communication system 108. For example, FIG. 1 illustrates the desktop computer 104b, the laptop computer 104c, the remote server device 104d, and the electronic device 104e being communicatively coupled to the communication system 108 via a communication link 120. The communication link 120 may be any suitable physical connection and/or wireless connection. Accordingly, the desktop computer 104b, the laptop computer 104c, and/or the remote server device 104d may be remotely located from the media device 102, wherein the appointment information from the respective electronic calendar application of the electronic devices 104 is communicated to the media device 102.

The exemplary smart phone 104a includes a display 122 configured to present visual information to the user. An exemplary calendar graphic 124 is generated by the electronic calendar application of the smart phone 104a, and is presented on the display 122 to the user (not shown). The calendar graphic 124 is indicated as representing a page of a hardcopy calendar for a month of interest. Individual days of the month are illustrated on the non-limiting example calendar graphic 124. Here, a hypothetical appointment is scheduled to occur on the eighth day of the example month, as illustrated by the bold highlighting of day 8 on the presented calendar graphic 124. Therefore, upon viewing the presented calendar graphic 124, the user of the smart phone 104a intuitively understands that they have a scheduled appointment on that day. The example desktop computer 104b and the laptop computer 104c are also illustrated as presenting the calendar graphic 124 on their respective display.

Depending upon the particular electronic calendar application implemented in the example smart phone 104a, the user of the smart phone 104a may actuate one or more of the controllers 126 on the surface of the smart phone 104a to obtain additional appointment information associated with a scheduled appointment. For example, additional appointment information included with the calendar graphic 124 is presented on the display 122 as textual information that describes the scheduled appointment. The presented appointment information indicates that the scheduled appointment is a meeting that requires the user to be at a remote location. The meeting is scheduled to begin at 8:30 p.m., and is scheduled to conclude at 10:00 p.m. The exemplary appointment location is at school, presumably understood by the user to be the school of the user's children (though other schools and/or locations may be understood to be the location for the scheduled appointment). Furthermore, the scheduled appointment is indicated as being a recurring type of appointment (thus intuitively informing the user that another meeting has been scheduled for the next month on the same day, or near the same day).

One skilled in the art understands that there are a variety of different electronic calendar applications that may be used by the various electronic devices 104. These different electronic calendar applications may provide different types of appointment information (one or more specific instances of appointment information) to the user. Non-limiting types of specific instances of appointment information include a name or other textual identifier of the scheduled appointment, temporal characteristics that define a period of the scheduled appointment (scheduled date, start time, duration, and/or end time), location of the scheduled appointment, whether the scheduled appointment is a one time appointment or a recurring appointment, the type of scheduled appointment, supplemental information pertaining to the scheduled appointment, names of other participants in the scheduled appointment, and/or contact information of other participants or of the remote location facility. Further, some specific instances of the above-identified appointment information may be optionally specified by the user. Other specific instances of the appointment information may be omitted and/or may not be required by the electronic calendar application.

Examples of specific instances of the appointment information are now described in greater detail. A first example specific instance of appointment information is a name or other textual identifier given to the scheduled appointment. The name of the scheduled appointment is typically a relatively short descriptive textual string (alpha numeric string) entered by the user. Alternatively, or additionally, the name of the scheduled appointment may be predefined by the electronic calendar application, where the user selects the predefined name from a group of available scheduled appointment names. Non-limiting example scheduled appointment names may include: meeting, telephonic conference, medical appointment, event, concert, movie, dinner, etc.

Another example specific instance of appointment information are the temporal characteristics of the scheduled appointment. Temporal information for the defined period of the scheduled appointment includes the date of the scheduled appointment, the start time of the scheduled appointment, the duration of the scheduled appointment, and/or the end time of the scheduled appointment.

Another example specific instance of appointment information is location information associated with the scheduled appointment. The location of the scheduled appointment may be specified as an address of the location, a description or name of the location, a zip code of the location, global positioning system (GPS) coordinates of the location, or the like.

Another example specific instance of appointment information is whether the scheduled appointment is a nonrecurring event or a recurring event which periodically repeats at predefined dates and times. If the scheduled appointment is a recurring type of event, the period of recurrence (or particular specified dates and times) of the recurring scheduled appointments may also be included in the appointment information for analysis by the calendar synchronization system 100.

Another example specific instance of appointment information is a descriptive textual string that describes the nature or type of the scheduled appointment. For example, the appointment information may indicate that the scheduled appointment is for a meeting and/or a phone call.

Another example specific instance of appointment information is supplemental information. The supplemental information is a descriptive textual string that further describes one or more attributes about the scheduled appointment. For example, but not limited to, the supplemental information may indicate to the user that the scheduled appointment may be for a school play, a movie, a cocktail party, or other social event. Alternatively, or additionally, the supplemental information may describe the subject matter of the scheduled appointment. Such information may assist the user in identifying appropriate dress for the scheduled appointment, what items to bring with them when they go to the scheduled appointment, and/or what topics the user should be prepared to discuss while at the scheduled appointment.

Another example specific instance of appointment information are names of other participants associated with the scheduled appointment. The names of other individuals may prompt the user to be more situationally aware of the environment associated with the scheduled appointment. For example, if the name of the individual is the user's work supervisor, the user may be better prepared to deal with the anticipated subject matter of the scheduled appointment.

Another example specific instance of appointment information is various contact information. The contact information may pertain to the location and/or other people associated with the scheduled appointment. For example, a phone number, e-mail address, or the like associated with the facilities where the scheduled appointment is to be held. The contact information may pertain to one or more of the participating parties who will be at the scheduled appointment. In some situations, the contact information may be associated with the above-described names of other participants associated with the scheduled appointment.

Regardless of the particular type of electronic calendar application implemented in a particular one of the electronic devices 104, the electronic calendar applications are configured to output appointment information that can be communicated to other electronic devices. For example, the user's electronic calendar application implemented on their smart phone 104*a* may output its appointment information for scheduled appointments to the electronic calendar application of the desktop computer 104*b*, the laptop computer 104*c*, and/or the remote server device 104*d*. When these other electronic calendar applications receive appointment information from other electronic calendar applications, the received appointment information is used to update the appointment information of the receiving electronic calendar application. This process of receiving and updating appointment information is known as calendar synchronization. In many instances, the calendar synchronization process is a two-way process wherein both of the electronic devices 104 exchange appointment information so that the electronic calendar applications of both of the electronic devices 104 have substantially the same appointment information.

Embodiments of the calendar synchronization system 100 residing in a media device 102 are similarly configured to receive appointment information from one or more of the electronic calendar applications of the various electronic devices 104 that may be used by the user. One-way calendar synchronization between the electronic devices 104 and the calendar synchronization system 100 provides the media device 102 appointment information associated with a scheduled appointment that is analyzed by the calendar synchronization system 100 to determine if the scheduled appointment requires the user to be at a remote location, and optionally, determine the location of the scheduled appointment relative to the location of the media device 102. Based on the analysis of the received appointment information by the calendar synchronization system 100, the media device 102 may then be configured and/or operated to perform one or more automatic operations.

As a non-limiting example of an automatic operation performed by the media device 102, the calendar synchronization system 100 may configure the media device 102 to automatically record a particular media content event of interest that is being received and/or presented concurrently with a scheduled appointment (under the assumption that the scheduled appointment requires the user to be at a remote location and will therefore not be able to view the presentation of the media content event of interest). Thus, when the user is no longer at the scheduled appointment, the user may retrieve and view the media content event of interest at a later time of their choosing.

Further, the calendar synchronization system 100 may be optionally configured to provide two-way calendar synchronization with the electronic device 104 that provides appointment information. For example, the user may schedule a new appointment into the electronic calendar application of their smart phone 104a. The electronic calendar application of the smart phone 104a may communicate appointment information describing the newly scheduled appointment to the calendar synchronization system 100 in the media device 102. The calendar synchronization system 100 may then schedule the recording of a media content event of interest that is scheduled for presentation at the same time as the newly scheduled appointment that requires the user to be at a remote location for the scheduled appointment. The determined recording information could be returned from the calendar synchronization system 100 to the smart phone 104a, and then incorporated into the electronic calendar application data at the smart phone 104a. Thus, if the user is later operating the electronic calendar application of the smart phone 104a, they can be notified that the calendar synchronization system 100 has automatically scheduled a recording of the media content event of interest.

Since each particular one of the electronic devices 104 may have an electronic calendar application that is different from other electronic calendar applications, embodiments of the calendar synchronization system 100 are configured to receive appointment information from a plurality of different types of electronic calendar applications. More importantly, the received appointment information provided by the various and different types of electronic calendar applications in the electronic devices 104 may employ different data formats. Therefore, embodiments of the calendar synchronization system 100 are configured to receive appointment information in different formats.

For example, the format of the communicated appointment information may specify a particular order in the various specific instances of appointment information (date, start time, duration or end time, appointment name, appointment location, appointment description, participant names, contact information, etc.). Thus, different electronic calendar applications may provide the specific instance of appointment information in a different order.

In other situations, different electronic calendar applications may use different specific instances of information. For example, one of the electronic calendar applications may specify an end time of the scheduled appointment and a different electronic calendar application may use a duration of the scheduled appointment. Embodiments of the calendar synchronization system 100 are configured to determine or calculate the end of a scheduled appointment using either form of appointment information.

Some electronic calendar applications may employ an industry standardized format. Thus, embodiments of the calendar synchronization system 100 are configured to receive appointment information that is formatted in accordance with accepted industry data formats. Regardless of the data format that is used to communicate appointment information from one of the electronic devices 104 to the calendar synchronization system 100 of the media device 102, the calendar synchronization system 100 is able to receive and process the received appointment information.

Some embodiments of the calendar synchronization system 100 in the media device 102 may be optionally configured to re-communicate the appointment information received from a particular one of the electronic devices 104 to selected ones of, or all of, the other electronic devices 104. Alternatively, or additionally, the scheduled recording information generated by the calendar synchronization system 100 may be communicated to one or all of the other media devices 104. That is, the calendar synchronization system 100 may optionally operate as a coordinator that provides updated appointment schedule information to selected ones of, or all of, the electronic devices 104.

For example, the user may schedule a new appointment into the electronic calendar application of their smart phone 104a. The electronic calendar application of the smart phone 104a may communicate appointment information describing the newly scheduled appointment to the calendar synchronization system 100 in the media device 102. The calendar synchronization system 100 may then automatically schedule the recording of a media content event of interest that is to occur at the time of the newly scheduled appointment that requires the user to be at a remote location. The calendar synchronization system 100 would have access to a stored list identifying other electronic devices 104 that are to also receive updated appointment information. Accordingly, the scheduled recording information and/or the new appointment information could be returned to any one of, or all of, the other electronic devices 104 that maintain calendars for the user. Thus, if the user is operating their laptop computer 104c, the electronic calendar application of the laptop computer 104c is notified by the calendar synchronization system 100 of the scheduled recording of the media content event of interest and/or is notified of the newly scheduled appointment made using the smart phone 104a. As another non-limiting example, if the user logs into a calendar service that resides in the remote server device 104d using electronic device 104e, the remote server device 104e or the electronic device 104e could then inform the user that the calendar synchronization system 100 has scheduled a recording of the media content event of interest.

If data formats used by the various electronic calendar applications are different from each other, the calendar synchronization system 100 may be configured to reformat the appointment information received from one of the electronic devices 104 into an appropriate format that is used by the other particular electronic devices 104. For example, the order of specific information may be rearranged into an order that is in accordance with the format used by the receiving one of the electronic devices 104. To illustrate, the smart phone 104a may provide the appointment information in a text string format that orders the information as follows: name of scheduled appointment, date of scheduled appointment, start time of scheduled appointment, duration of scheduled appointment, and brief description of scheduled appointment. Another one of the electronic devices 104 may have an electronic calendar application that requires appointment information in the following format: date of scheduled appointment, start time of scheduled appointment, duration of scheduled appointment, name of scheduled appointment, brief description of scheduled appointment. Here, embodiments of the calendar synchronization system 100 would reorder the specific information into the format used by the other electronic device 104, and then communicate the reformatted appointment information to the other electronic device 104 (which could then update its calendar information accordingly).

In some situations, the length or amount of a particular instance of specific information may be different between various electronic calendar applications. For example, the supplemental information that provides a brief description of the scheduled appointment may be limited to one hundred characters (a first textual character limit) in an example electronic calendar application used by one of the electronic devices 104. Another one of the electronic calendar applications may limit the length of the brief description of the scheduled appointment to fifty characters. Embodiments of the calendar synchronization system 100 may be configured to modify the received description of the scheduled appointment to fit within the fifty character limit to comply with format requirements of the receiving electronic device 104. For example, the text in excess of the fifty character limited (a second textual character limit) might be truncated, deleted, or otherwise removed from the supplemental information. Alternatively, or additionally, non-critical terms could be deleted (such as prefix or connector type terms: a, the, and, of, or, etc.) until the fifty character limit is reached. For example, but not limited to, non-critical terms may first be deleted, then remaining text that exceeds a test character limit could then be deleted.

Some embodiments of the calendar synchronization system 100 may be configured to change the form of the received appointment information. For example, one of the electronic devices 104 may specify a start time and duration of the scheduled appointment. Embodiments of the calendar synchronization system 100 may be configured to determine or compute the end time of the scheduled appointment based on the received start time and duration of the scheduled appointment. Then, the start time and the computed end time of the scheduled appointment could be communicated to another one of the electronic devices 104 in the required data format. Further, the determined end time may be used to define automatic operations defined by the calendar synchronization system 100, such as an end time of any automatically scheduled recordings.

FIG. 1 further illustrates that the media device 102 is a component of a media system 128. The exemplary media system 128 also comprises a remote control 130, a visual presentation device 132, and an audio presentation device 134. Non-limiting examples of the visual presentation device 132 include televisions, monitors, personal computers, laptop computers or other electronic devices that include, or are coupled to, the relatively large display 136. Some visual presentation devices 132 may optionally include speakers (not shown) that emit the audio portions of received media content. Non-limiting examples of the audio presentation device 134 include surround sound receivers, stereos, radios or other electronic devices that include, or are coupled to, one or more speakers 138.

During operation of the media system 128, the user may control presentation of a media content event by actuating one or more of the controllers 140 on the remote control 130. The remote control 130 generates a device command that is communicated to the media device 102 via a wireless signal 142. The wireless signal 142 may be an RF signal, an infrared signal, or the like. Based on the instructions generated by the remote control 130, the media device 102 provides a stream of video information 144 (and optionally a stream of audio information) to the visual presentation device 132. In some media systems 128, a stream of audio information 146 may be provided to the audio presentation device 134.

At some point during the presentation of a media content event, the user may decide that they would like to change channels to watch a different media content event. To view alternative media content event viewing choices, the user may operate the media device 102 such that an electronic program guide (EPG) 148 is presented on the display 136.

The example EPG 148 is a type of a graphical user interface that presents a menu, or a series of menus, that describe available media content events that are available for presentation. The example EPG 148 has the look and feel of a table that uses a combination of text and/or symbols to indicate the media content event viewing choices that may be selected by the user. The program information presented on the EPG 148 may include the title of available media content events, the "channel" of the available media content events, the scheduled time and date of the media content event presentation, and optionally a brief description of the media content event. The EPG 148 is interactive with the user. The user, by actuating one or more of the controllers 140 on their remote control 130, is able to "scroll" or "navigate" about the EPG 148 to select a media content event of interest.

The exemplary EPG 148 shows the channels and names for a plurality of media content events that are available for presentation on April 8, between the hours of 8:00 p.m. and 11:30 p.m. It is appreciated that the size of the display 136 limits the amount of information that may be presented by an EPG 148. Accordingly, the EPG 148 only presents at any given moment a limited number of channels (here, channels associated with stations A-G) for a limited amount of time (here, from the four and a half hours spanning the times from 8:00 p.m. to 11:30 p.m.). By actuating one or more of the controllers 140 on their remote control 130, the user may adjust the presented range of channels and/or range of time durations of the EPG 148.

In the hypothetical example illustrated in FIG. 1, the current time is indicated as being 4:00 p.m. (as noted in the upper right hand corner of the presented EPG 148). Thus, it is apparent that the user has turned on at least the media device 102 and the visual presentation device 132, and has initiated presentation of the EPG 148. Here, it is further appreciated that the user has advanced the time period presented by the EPG 148 from the current time of 4:00 p.m. to a future time of 8:00 p.m. so that the user can view available media content event choices that may be of interest during that future time period. Here, recording of the "Program E-1" can be scheduled by the user by navigating about the presented EPG 148 to highlight the portion of the EPG 148 that is presenting the "Program E-1" information.

In the above-described hypothetical example, the calendar synchronization system 100 has previously received appointment information from the electronic calendar application of the smart phone 104*a* which indicates that the user has a scheduled appointment from 8:30 p.m. to 10:00 p.m. on April 8. Embodiments of the calendar synchronization system 100 compare the received appointment information with other information residing in the media device 102, and based on the comparison, causes the media device 102 to perform one or more automatic operations when the appointment information indicates that the user will not be able to manually operate and/or use the media device 102 during the time of the scheduled appointment. That is, one or more automatic operations for the media device 102 are defined when a scheduled appointment may require that the user is to be at a remote location during the scheduled appointment.

Figure 2:
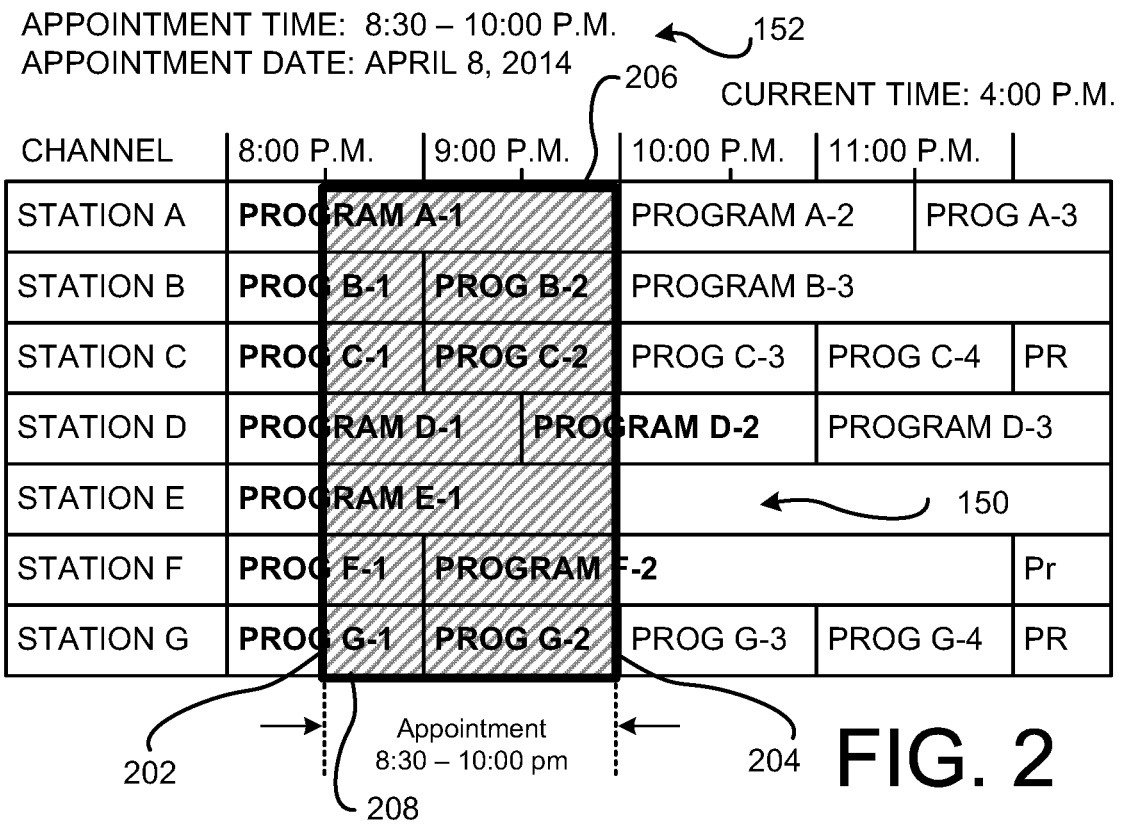
FIG. 2 is an example presented electronic program guide (EPG) with a scheduled appointment region that indicates the start time and the end time of a scheduled appointment.

In the example embodiment illustrated in FIG. 1, which is also shown in greater detail in FIG. 2, the calendar synchronization system 100 operates the media device 102 to automatically modify presentation of the EPG 148 to indicate that there is a scheduled appointment beginning at 8:30 p.m. and ending at 10:00 p.m. The scheduled appointment is indicated on the presented EPG 148 by bordering a region 150 of the presented EPG 148 (between the hours of 8:30 p.m. and ending at 10:00 p.m.), hereinafter interchangeably referred to as the scheduled appointment region 150. Embodiments of the calendar synchronization system 100 define the scheduled appointment region 150 by identifying or determining the time period (start time and the end time) of the scheduled appointment based on the received appointment information.

Here, the example EPG 148 is modified by presenting a scheduled appointment region 150 that overlays the media content event information of the presented EPG 148. The scheduled appointment region 150 is presented using indicator lines that encircle the scheduled appointment region 150 to intuitively inform the user that they have a conflicting scheduled appointment that will prevent their viewing of the media content events (interchangeably referred to herein as programs) which are encompassed or covered by the scheduled appointment region 150. For example, a first indicator line 202 is presented that coincides with the start time of the scheduled appointment and the corresponding times of scheduled media content events. A second indicator line 204 is presented that coincides with the end time of the scheduled appointment and the corresponding times of scheduled media content events. Top and bottom indicator lines 206 and 208, respectively, may be presented at the top and bottom presented portions of the EPG 148.

Embodiments of the calendar synchronization system 100 define the first indicator line 202 of the scheduled appointment region 150 by identifying or determining the start time of the scheduled appointment based on the received appointment information. The second indicator line 204 is defined by identifying or determining the end time of the scheduled appointment based on the received appointment information. Any time that an EPG is generated and presented which shows available media content events that encompasses the determined start time and the end time of the scheduled appointment, the scheduled appointment region 150 is generated and added to the presented EPG.

The region of the scheduled appointment region 150 may be further delineated by adding onto a portion of the presented EPG 148 that lies between the first indicator line 202 and the second indicator line 204 any desirable fill shading, fill coloring, and/or fill pattern. The added fill shading, fill coloring, and/or fill pattern to modify a presented EPG further highlights the scheduled appointment region 150. For example, FIG. 1 employs a partially transparent fill pattern of diagonal lines within the border of the scheduled appointment region 150. The partially transparent fill shading, fill coloring, and/or fill pattern permits viewing of the textual information about the media content events that are in conflict with the scheduled appointment associated with the scheduled appointment region 150 so that the user's awareness of the conflicting scheduled event is heightened.

Alternatively, or additionally, text coloring, border line coloring, line or text flashing may be used to enhance the user's awareness of the conflicting scheduled appointment beginning at 8:30 p.m. and ending at 10:00 p.m. For example, but not limited to, the text information describing the media content events may be presented using a bold and/or colored font, such as red, magenta, yellow, or the like. Thus, when a different font is used for the descriptive text information of media content events that lie within the scheduled appointment region 150, or are at least partially bounded by the scheduled appointment region 150, the user's awareness of the conflicting scheduled event is heightened. For example, if a bold red font is used, which is different from the non-bold black font used to present textual information on the EPG that are outside of the first indicator line 202 or the second indicator line 204, the user readily appreciates which media content events are in conflict with the scheduled appointment.

In the hypothetical example illustrated in FIG. 1, the user will intuitively appreciate the conflict between the viewing of the media content event of interest presented on the particular channel associated with Station E ("Program E-1") and their scheduled appointment. That is, the presentation times of the media content event of interest identified as "Program E-1" is in conflict with the times of the scheduled appointment. Accordingly, the user may choose to manually initiate a recording of the media content event by actuating one or more of the controllers 140 on their remote control 130. The user may then depart for their scheduled appointment (the meeting from 8:30 p.m. to 10:00 p.m.), and upon returning, may initiate presentation of the recorded media content event of interest.

Alternatively, or additionally, the calendar synchronization system 100 may automatically modify the presented EPG 148 to indicate each of the media content events that are entirely or partially in conflict with the scheduled appointment. In the example embodiment of FIG. 1, the media content events that cannot be viewed in their entirety because of the times of the scheduled appointment are automatically highlighted to the user using a bold font. Alternatively, or additionally, the font of the text associated with these media content events may be presented in a different color, such as a bright red color, magenta color or other suitable color that is readily noticeable by the user. The bounded interior region of the media content events may be alternatively, or additionally, highlighted using a fill shading, a fill color, and/or a fill pattern to further emphasize to the user of a conflict between viewing these media content events and the scheduled appointment.

Alternatively, or additionally, the calendar synchronization system 100 may modify the EPG 148 to present textual information 152 describing the scheduled appointment when a time period encompassed by the presented EPG coincides with a time period of the scheduled appointment. In some embodiments, the textual information 152 describing the scheduled appointment is presented when there is any scheduled appointment. In other embodiments, the textual information 152 is presented only when the time period encompassed by the presented EPG coincides with the time period of the scheduled appointment, such as when the user scrolls the EPG 148 forward in time. In the example embodiment illustrated in FIG. 1, the textual information 152 is presented at the top left hand side of the EPG. The textual information 152 may be presented at any suitable location on the display 136, and/or on the EPG 148. Any suitable font type, color, and/or highlighting may be used to present the textual information 152. Any suitable information of the appointment information may be included in the presented textual information 152.

In situations when a plurality of scheduled appointments are known, a plurality of multiple scheduled appointment regions may be shown for each of the individual scheduled appointments. Such multiple scheduled appointment regions 150 may even be shown to overlap with each other. Different and/or overlapping multiple scheduled appointment regions 150 may be shown using different colors, fill shading, fill color, and/or fill pattern to further emphasize differences between the multiple scheduled appointment regions 150.

Figure 3:
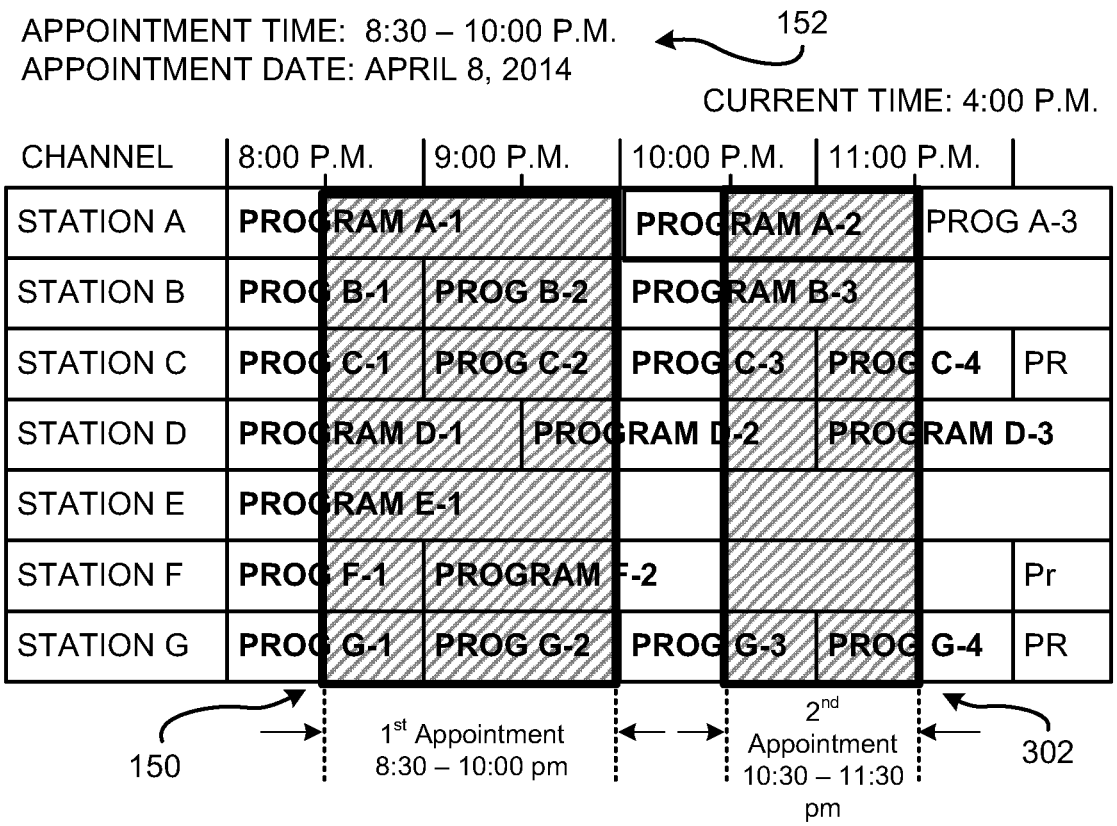
FIGS. 3 and 4 illustrate example EPGs wherein multiple scheduled appointments have been scheduled for the same region of time shown by the presented EPG.

FIG. 3 illustrates an example situation wherein multiple scheduled appointments have been scheduled for the same region of time shown by the presented EPG 148 of FIG. 2. In this exemplary situation, the appointment information indicates that a second scheduled appointment is from 10:30-11:30 p.m. Accordingly, a second scheduled appointment region 302 is illustrated on the EPG 148.

Additionally, or alternatively, the calendar synchronization system 100 may automatically modify the presented EPG 148 to indicate all of the media content events that are entirely or partially in conflict with the multiple scheduled appointments. For example, but not limited to, media content events that are entirely or partially in conflict with the multiple scheduled appointments are indicated using bold presented text fonts. Any particular type of indication may be used, such as different font colors, and/or with highlighting with fill colors, fill patterns, or the like.

Figures 4, 6:
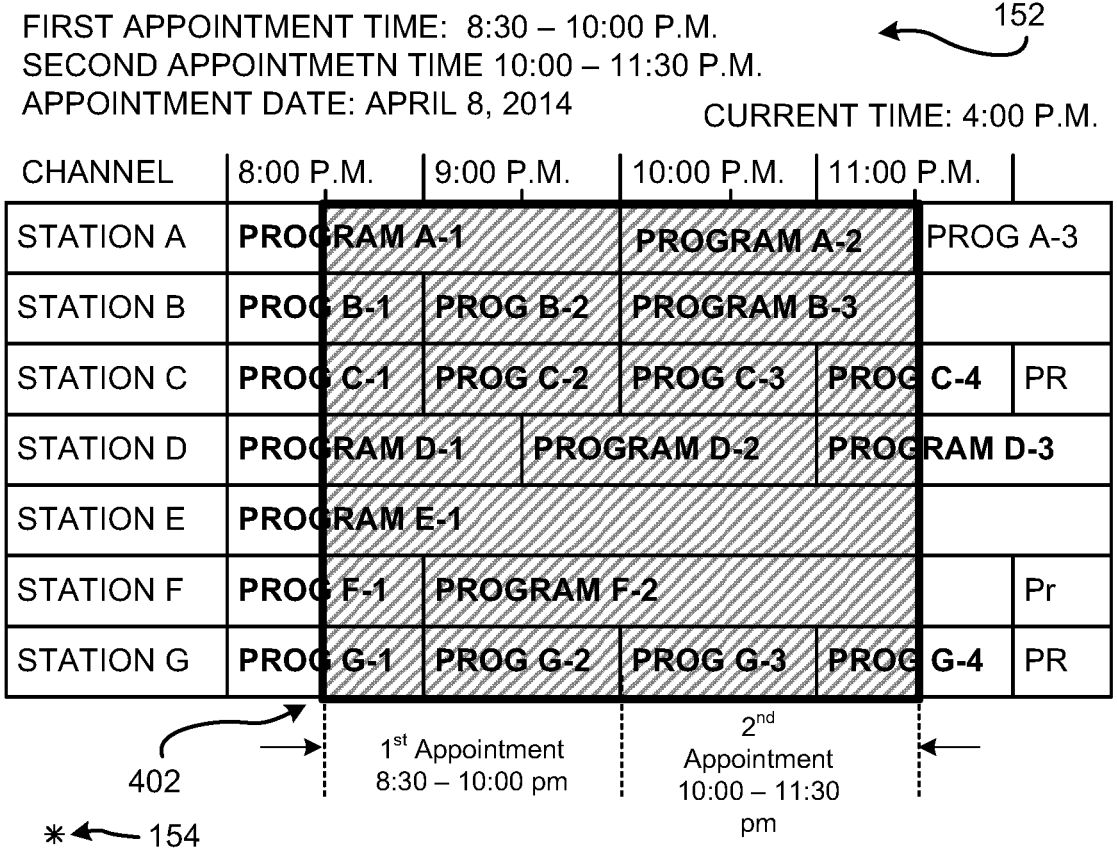
FIG. 6 illustrates an example graphical user interface (GUI) that permits the user to selectively initiate a calendar synchronization request to one or more of the electronic devices.

FIG. 4. illustrates an example situation wherein multiple scheduled appointments have been scheduled for the region of time shown by the presented EPG 148 of FIG. 2. In this exemplary situation, the appointment information indicates that a second scheduled appointment is from 10:00-11:30 p.m. regions 150 has been scheduled for the user. Accordingly, a second scheduled appointment region 302 is illustrated on the EPG 148. Alternatively, a single scheduled appointment region 150 may be presented which bounds the totality of the time periods encompassed by the multiple scheduled appointments. Additionally, or alternatively, the calendar synchronization system 100 may automatically modify the presented EPG 148 to indicate all of the media content events that are entirely or partially in conflict with the multiple scheduled appointments, such as by bolding presented text fonts, coloring text fonts, and/or with highlighting with fill colors, fill patterns, or the like.

In the situation illustrated in FIG. 4, embodiments of the calendar synchronization system 100 determine that there are two overlapping or adjacent scheduled appointments by comparing the ending time of the earlier appointment with the start time of the second appointment. Then, embodiments of the calendar synchronization system 100 define the scheduled appointment region 402 by identifying the start time of the first scheduled appointment and the end time of the second scheduled appointment based on the received appointment information. Any time that an EPG is generated and presented which shows available media content that encompasses the determined start time of the first scheduled appointment and the end time of the second scheduled appointment, the scheduled appointment region 402 is generated and added to the presented EPG.

In some embodiments, the above-described scheduled appointment regions may not be presented when an EPG is initially presented. In such situations, if there is a conflict between one or more scheduled appointments and the times presented on the EPG, a suitable prompt or graphical icon 154, a pop-up window, or the like may be presented. If the user selects the prompt or graphical icon 154, or navigates to the pop-up window, then the scheduled appointment regions may be then shown on the presented EPG.

Figure 5:
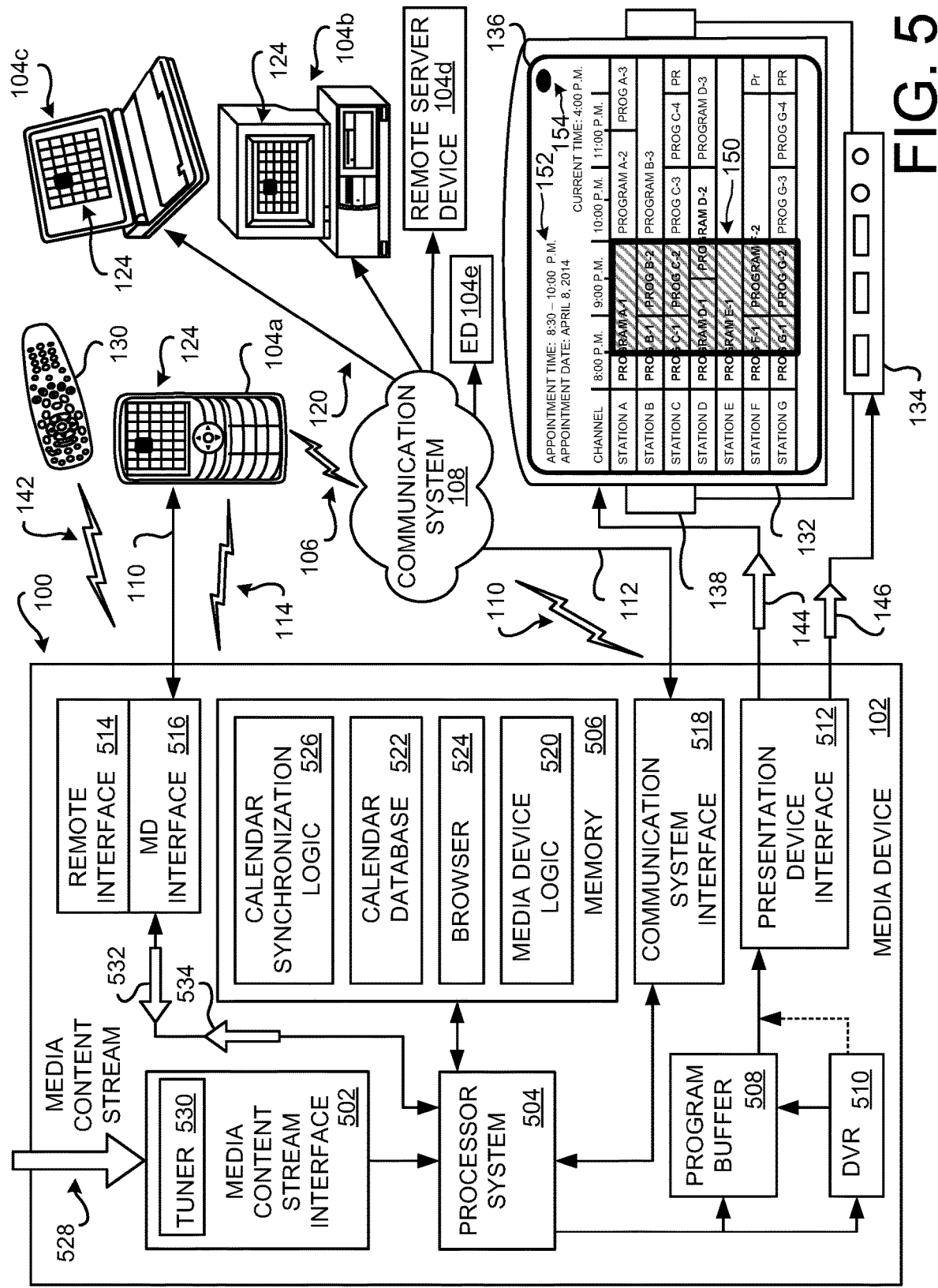
FIG. 5 is a block diagram of an embodiment of the calendar synchronization system implemented in an exemplary media device.

FIG. 5 is a block diagram of an embodiment of the calendar synchronization system 100 implemented in an exemplary media device 102. Examples of the media device 102 include, but are not limited to, a set top box (STB). Embodiments of the media presentation system 100 may be implemented in other media devices, such as, but not limited to, a stereo, a surround-sound receiver, a radio, a television (TV), a digital video disc (DVD) player, a digital video recorder (DVR), a game playing device, or a personal computer (PC).

The non-limiting exemplary media device 102 comprises a media content stream interface 502, a processor system 504, a memory 506, a program buffer 508, an optional digital video recorder (DVR) 510, a presentation device interface 512, a remote interface 514, an optional mobile device (MD) interface 516, and an optional communication system interface 518. The memory 506 comprises portions for storing the media device logic 520, the calendar database 522, an optional browser 524, and calendar synchronization logic 526. In some embodiments, the media device logic 520, the calendar synchronization logic 526, and/or the optional browser 524 may be integrated together, and/or may be integrated with other logic. In other embodiments, some or all of these memory and other data manipulation functions may be provided by using a remote server or other electronic devices suitably connected via the Internet or otherwise to a client device. Other embodiments of the media device 102 may include some, or may omit some, of the above-described media processing components. Further, additional components not described herein may be included in alternative embodiments.

The functionality of the media device 102, here a set top box (STB), is now broadly described. A media content provider provides media content that is received in one or more multiple media content streams 528 multiplexed together in one or more transport channels or the like. Such media content streams 528 are broadcasted streams of content with one or more channels presenting a media content event.

The transport channels with the media content streams 528 are communicated to the media device 102 from a media system sourced from a remote head end facility (not shown) operated by the media content provider. Non-limiting examples of such media systems include satellite systems, cable systems, and the Internet. For example, if the media content provider provides programming via a satellite-based communication system, the media device 102 is configured to receive one or more broadcasted satellite signals detected by an antenna (not shown). Alternatively, or additionally, the media content stream 528 can be received from one or more different sources, such as, but not limited to, a cable system, a radio frequency (RF) communication system, or the Internet.

The one or more media content streams 528 are received by the media content stream interface 502. One or more tuners 530 in the media content stream interface 502 selectively tune to one of the media content streams 528 in accordance with instructions received from the processor system 504. The processor system 504, executing the media device logic 520 and based upon a request for a media content event of interest specified by a user (not shown), parses out media content associated with the media content event of interest. Some media devices 102 implement the tuner function using software.

The media content event of interest is then assembled into a stream of video and/or audio information which may be stored by the program buffer 508 such that the media content can be streamed out to the media presentation device, such as the visual presentation device 132 and/or the audio presentation device 134, via the presentation device interface 512. Alternatively, or additionally, the parsed out media content may be saved into the DVR 510 for later presentation. The DVR 510 may be directly provided in, locally connected to, and/or remotely connected to, the media device 102.

In this simplified embodiment, the presentation device interface 512 is illustrated as coupled to a media system 128 that includes the visual presentation device 132, such as a television (hereafter, generically a TV), and the audio presentation device 134, such as a surround sound receiver. Other types of output devices may also be coupled to the media device 102, including those providing any sort of stimuli sensible by a human being, such as temperature, vibration and the like. The video portion of the streamed media content is displayed on the display 136 and the audio portion of the streamed media content is reproduced as sounds by the speakers 138.

From time to time, the media device 102 receives EPG information, such as in the media content streams 528 or from another source. The received EPG information contains a listing or the like about media content events that are scheduled for presentation. The EPG information, for each media content event, lists a name of the media content event, a channel that the media content event is available on, and the presentation date, start time, and duration or end time of the media content event. Optionally, descriptive information about the media content event may be included in the EPG information. The EPG information is stored in the memory 506 or in another suitable memory medium accessible by the calendar synchronization system 100.

The above processes performed by the media device 102 are generally implemented by the processor system 504 while executing the media device logic 520. Thus, the media device 102 may perform a variety of functions related to the processing and presentation of one or more media content events received in the media content stream 528.

The communication system interface 518 is configured to communicatively couple the media device 102 to the communication system 108 to enable communications to the smart phone 104a, the desktop computer 104b, the laptop computer 104c, the remote server device 104d, and/or the electronic device 104e. The communication system interface 518 may be configured to receive and/or transmit the wireless signal 110. For example, but not limited to, an embodiment may employ a suitable Wi-Fi enabled modem or the like to access the Internet. Alternatively, or additionally, the communication system interface 518 may be configured to communicate via the physical connection 112 using wire-based signals. Accordingly, the communication system interface 518 comprises one or more suitable transceivers (not shown), modems, or the like that are configured to communication the wire-based signals to the communication system 108.

Alternatively, or additionally, embodiments of the media device 102 may include the mobile device interface 516 that is configured to receive communications from one or more of the electronic devices 104 (conceptually illustrated by the arrow 532), such as the example smart phone 104a. In an exemplary embodiment, the mobile device interface 516 receives the wireless signal 114 transmitted from the smart phone 104a. The wireless signal 114 may use any suitable communication medium, such as, but not limited to, an RF medium or an infrared medium. Accordingly, the mobile device interface 516 comprises one or more suitable RF or infrared transceivers (not shown). Further, the one or more wireless transceivers are configured to communicate appointment information and/or scheduled recording information (conceptually illustrated by the arrow 534) generated by the processor system 504 back to the smart phone 104a.

Alternatively, or additionally, the mobile device interface 516 may be configured to communicate with one or more of the electronic devices 104 via the physical connection 110 using wire-based signals and/or with the detachable memory medium 118. Accordingly, the mobile device interface 516 comprises one or more suitable transceivers (not shown) that are configured to receive the wire-based signals or information from the detachable memory medium 118.

As described herein, a user (not shown) may view and/or listen to various program content events when presented on the exemplary visual presentation device 132 and/or the exemplary audio presentation device 134. That is, based upon the user commands, typically generated at and transmitted from the remote control 130 as a wireless signal 142 that is received by the remote interface 514, the media device 102 can then control itself and/or other various media devices that it is communicatively coupled to. Accordingly, available program content is presented in accordance with the generated user commands.

In an exemplary embodiment, the remote interface 514 is configured to receive the wireless signal 142 transmitted from the remote control 130. The wireless signal 142 may use any suitable communication medium, such as, but not limited to, an RF medium or an infrared medium. Accordingly, the remote interface 514 comprises one or more suitable RF or infrared transceivers (not shown) that are configured to receive the wireless signal 142.

In some embodiments, the mobile device interface 516 and the remote interface 514 may be an integrated interface device or a single device. For example, but not limited to, the integrated interface may be configured to receive RF signals from either the remote control 130 or one or more of the electronic devices 104, such as the example smart phone 104a.

Embodiments of the calendar synchronization system 100 are configured to receive, during calendar synchronization, appointment information that has been entered or modified by the user operating an electronic calendar application residing in one of the electronic devices 104. A calendar synchronization between the media device 102 and one or more of the electronic devices 104 may be initiated in a variety of manners.

In an example embodiment, the media device 102 may from time to time, or periodically, generate and transmit a calendar synchronization request to one or more of the electronic devices 104. In an exemplary embodiment, periodic calendar synchronization requests may be generated by the media device 102 hourly, daily, weekly or the like.

Alternatively, or additionally, the calendar synchronization request may be sent to one or more of the electronic devices 104 when the user begins operation of the media device 102.

Calendar synchronization requests are based on information stored in the calendar database 522. For example, identities and required contact information for the electronic devices 104 that are associated with the user's electronic calendar applications are stored in the calendar database 522, in another data file in the memory 506, or in another suitable memory medium that is accessible by the processor system 504. In embodiments where the media device 102 initiates the calendar synchronization request, the identities and contact information of the electronic devices 104 that are to receive the calendar synchronization request are retrieved, accessed, or looked up. A calendar synchronization request is generated and transmitted to one or more of the identified electronic devices 104 based on the retrieved contact information.

The contact information includes information on the particulars of contacting the electronic device 104 receiving a calendar synchronization request. For example, the contact information may include the mobile identifier, cell phone number, or the like of the smartphone 104a. An email address may be included in the contact information for the desktop computer 104b and/or the laptop computer 104c. A web site address or the like may be included in the contact information for the remote server device 104d. Additionally, the contact information may include login and/or password information if required.

In an example embodiment, electronic devices 104 responding to the calendar synchronization request provide appointment information for newly scheduled appointments that have been made since a last, previous, or most recent calendar synchronization update. Alternatively, the communicated appointment information includes the information for all currently scheduled appointments on the electronic calendar application of the responding electronic device 104.

Alternatively, the calendar synchronization request may specify a duration of interest for which new or modified scheduled appointments have been made by the user when using that particular device 104. In some embodiments, the duration may be user specified. For example, the user may be interested in potential scheduled appointments during the coming week. Accordingly, the user may specify the above duration of interest as seven days, a week, by dates, or the like.

Alternatively, or additionally, the duration may be predefined. For example, the duration may correspond to the time period encompassed by the EPG information, or may extend beyond the time period encompassed by the EPG information by some predefined amount. For example, if the EPG information stored at the media device 102 encompasses a two week window, the duration may be two weeks since this duration is a relevant with respect to what can be analyzed by the calendar synchronization system 100. Alternatively, the duration may be increased to three weeks since the extended schedule information will become relevant as time progresses and as EPG information updates are received at the media device 102.

In some embodiments, the user may be able to initiate a calendar synchronization request. In an exemplary embodiment, the user may be presented a selectable prompt or graphical icon 154 on the display 136. The prompt or graphical icon 154, a pop-up window, or the like may be included as part of a presented EPG. Alternatively, or additionally, the prompt or graphical icon 154, a pop-up window, or the like may be separately presented while a media content event is being presented. Alternatively, or additionally, the prompt or graphical icon 154, pop-up window, or the like may be presented when the user initially begins to use the media device 102. Any suitable form or type of prompt or graphical icon 154, pop-up window, or the like may be used which intuitively indicates to the user that selection of the prompt or graphical icon 154 will cause a calendar synchronization request to be initiated. In some embodiments, selection of the prompt or graphical icon 154 by the user causes presentation of a special selection page (such as the example GUI 602). In some embodiments, the prompt or graphical icon 154, pop-up window, or the like is presented for a limited duration, and then is removed or fades away, so as to no longer be presented. For example, the prompt or graphical icon 154, pop-up window, or the like may be presented for ten seconds, and then fade away.

Alternatively, or additionally, a designated one of the controllers 140 on the remote control 130 may be actuated by the user to initiate a calendar synchronization request. For example, actuation of a designated function button on the remote control may cause the media device to generate and transmit the calendar synchronization request to a predefined one of the electronic devices 104, to selected ones of the electronic devices 104, or to all of the electronic devices 104. Alternatively, actuation of one of the controllers 140 may initiate presentation of the prompt or graphical icon 154, pop-up window, or the like (which may then be presented for a limited duration and/or until the user actuates one or more of the controllers 140).

Alternatively, or additionally, a designated one of the controllers 140 on the remote control 130 may be actuated by the user to initiate a presentation of an interactive graphical menu, graphical user interface (GUI), or the like which permits the user to initiate a calendar synchronization request. FIG. 6 illustrates an example GUI 602 that permits the user to selectively initiate a calendar synchronization request to one or more of the electronic devices 104. Each of the predefined electronic devices 104 that the user may want to initiate a calendar synchronization request with are indicated on a list 604 presented on the GUI 602. The user selects those electronic devices 104 that are of interest, and then the calendar synchronization system 100 generates and transmits the calendar synchronization request to the selected ones of the electronic devices 104.

For example, the GUI 602 indicates that the user has selected the smart phone 104a and the desktop computer 104b for a calendar synchronization, as indicated by the check-marked boxes adjacent to the identifiers of those electronic devices 104. When the user actuates the select controller or another suitable one of the controllers 140 on their remote control 130, the calendar synchronization system 100 generates and transmits the calendar synchronization request to the selected smart phone 104a and the desktop computer 104b. In this situation, the information stored in the calendar database 522 includes phone numbers, e-mail addresses, Internet link information (such as a http address or the like), along with any login and/or password information if required.

Some embodiments may permit the user to enter information designating another electronic device of interest. The user provides the contact information for the other electronic device of interest by filling out the data field 606 on the GUI 602. If the other electronic device of interest is a phone-based device, the user may simply provide the phone number in the data field 606 along with any login and/or password information if required. If the other electronic device of interest is an Internet connected device with an e-mail based electronic calendar application, the user may simply provide the e-mail address or Internet link information (such as a http address or the like) in the data field 606, along with any login and/or password information if required. Here, the phone number, e-mail address or the like is used by the media device 102 to establish a communication link to the associated electronic device 104, and the login and/or password information is provided to access the resident electronic calendar application of the electronic device 104.

Some embodiments of the media device 102 may include a separate electronic calendar application. Calendar synchronization requests may be generated and transmitted to all of the electronic devices 104 or to selected ones of the electronic devices 104 when the user is using a local electronic calendar application (not shown) of the media device 102. Here, the user may use the local electronic calendar application, and when a scheduled appointment is defined by the user, the calendar synchronization requests may be generated and transmitted. For example, the user may schedule an automatic viewing of or request a notification for a media content event of interest using the local electronic calendar application. As a result of the calendar synchronization with one or more of the electronic devices 104, embodiments of the calendar synchronization system 100 may notify the user of any identified conflicts with scheduled appointments.

Alternatively, the calendar synchronization system 100 may include an electronic calendar application. In such media devices 102, the calendar synchronization system 100 may also perform a calendar synchronization process with the electronic calendar application residing in the media device 102.

Other predefined actions or activities performed by the user may cause the automatic generation and transmission of a synchronization request to the electronic devices 104. For example, the user may couple the detachable memory medium 118 to the media device 102 to manually load appointment information. In response to coupling the detachable memory medium 118 to the media device, or in response to adding the appointment information stored in the detachable memory medium 118, the calendar synchronization request may be generated and transmitted to one or more of the electronic devices 104.

Alternatively, or additionally, a calendar synchronization request may be initiated by one of the electronic devices 104. In an example embodiment, one or all of the electronic devices 104 are configured to transmit a calendar synchronization request to the media device 102. If the media device 102 acknowledges the calendar synchronization request, the appointment information may then be communicated from the electronic device 104 to the media device 102. Alternatively, the communicated calendar synchronization request may include the appointment information.

The calendar synchronization requests may be sent from the electronic devices 104 to the media device 102 on a periodic basis. Alternatively, or additionally, the calendar synchronization request may be sent to the media device 102 in response to use of the electronic device 104 by the user. For example, but not limited to, a calendar synchronization request may be sent when the user is using the electronic calendar applications or performing another function using the electronic device 104. Alternatively, or additionally, the calendar synchronization request may be sent when the user enters in or modifies appointment information for a new or existing scheduled appointment into the electronic calendar application of the particular electronic device 104. In this situation, appointment information for all scheduled appointments may be sent, or alternatively, only the appointment information for the new scheduled appointment or modified scheduled appointment may be sent from the electronic device 104 to the media device 102. Additionally, the scheduled appointment information may be for a limited duration of time, such as the duration that is spanned by the EPG information stored at the media device (such as two weeks, for example). Alternatively, or additionally, the calendar synchronization request may be sent when the user manually initiates a calendar synchronization request using their electronic device 104.

In embodiments where the calendar synchronization request is sent from the electronic device 104 to the media device 102, an acknowledgement or handshake operation may be performed between the electronic device 104 and the media device 102. Thus, if an acknowledgement from the media device 102 is received, or if a handshake occurs to exchange the appointment information, the appointment information is communicated from the electronic device 104 to the media device 102. Additionally, the user may be notified at the sending electronic device 104 that the appointment information has been successfully communicated to the media device 102. Also, the user may be notified that the media device 102 will perform an automatic operation after the media device 102 has received the appointment information, such as automatically recording one or more media content events.

As disclosed above, a variety of automatic operations of the media device 102 may be defined and/or performed by embodiments of the calendar synchronization system 100 based on the received appointment information. In some situations where media content events have presentation times in conflict with the scheduled appointments, these media content events cannot be watched by the user. Alternatively, or additionally, these conflicting media content events cannot be recorded unless the user has manually configured to record any media content events of interest when received at the media device 102. Accordingly, embodiments of the calendar synchronization system 100 may be configured to automatically configure the media device to record the conflicting media content events. For example, the calendar synchronization system 100 may set record timers and/or specify channel or station identifiers to schedule a recording of a particular media content event. Any known information may be specified so as to cause the media device 102 to record a media content event.

However, one skilled in the art appreciates that it is not practical to record every one of the received media content events that are in conflict with a scheduled appointment that requires the user to be at a remote location. That is, since the media device 102 may receive several hundred, or even thousands, of different channels of media content, it is not practical to provide sufficient recording capacity in the DVR 510 to record all received media content events. Further, in some media devices 102, the number of tuners 530 in the media device 102 may limit the number of media content events that may be recorded. Accordingly, embodiments of the calendar synchronization system 100 employ a filtering process to identify and select particular ones of the conflicting media content events for automatic recording.

In an example embodiment, a user's list of favorite programs and/or channels may be saved in memory 506, or may be available in another memory medium. In the event that sufficient recording capacity is available in the DVR 510 and/or if a sufficient number of tuners 530 are available, those conflicting media content events identified in the user's list of favorite programs and/or channels are automatically recorded (at least for those conflicting media content events that have not already been scheduled for recording by the user). That is, the calendar synchronization system 100 retrieves, accesses, or looks up the information in the user's favorites list, and then automatically records the conflicting media content events which are identified in the favorites list.

In the event that the media device 102 does not have sufficient capacity in the DVR 510 to record all of the conflicting media content events identified in the user's list of favorite programs and/or channels, then a prioritization scheme may be employed to automatically identify and record those conflicting media content events that are most likely to be of heightened interest to the user. That is, one or more higher priority media content events may be automatically recorded, while lower priority media content events are not recorded.

For example, the favorites list feature may provide a way for the user to specify or designate relative importance among a plurality of media content events included in the user's list of favorite programs and/or channels. The user may specify a priority number to each of the media content events in their list of favorite programs and/or channels. Or, groups of media content events may be prioritized. The user specified prioritization information may then be saved in the calendar database 522 or in another suitable memory location or medium for later use by the scheduled appointment region 150. Then, in the event of a schedule conflict, the highest priority media content events are recorded to the extent of recording capacity is available in the DVR 510 and/or available tuners 530.

Based on prioritization information, the calendar synchronization system 100 may identify and select particular conflicting media content events for automatic recording. For example, if the DVR has ten (10) hours of recording capacity available, then the durations of the highest priority conflicting media content events are used to identify and then automatically record those highest priority conflicting media content events that can be stored without exceeding the recording capacity, or a predefined threshold capacity amount therein, of the DVR 510. That is, the calendar synchronization system 100 retrieves, accesses, looks up, or determines the priority information, and then automatically records the highest priority conflicting media content events.

In the event that the media device 102 does not have a sufficient number of tuners 530 available to record all of the conflicting media content events identified in the user's list of favorite programs and/or channels, then the prioritization scheme may be employed to automatically identify and record those conflicting media content events that are most likely to be of heightened interest to the user. For example, if the media device 102 is configured with four tuners 530, then the four highest priority conflicting media content events may be automatically recorded. In some embodiments, a media content event that has been manually scheduled by the user for recording is assigned the highest priority.

Alternatively, or additionally, embodiments of the calendar synchronization system 100 may be configured with a learning function or algorithm that may be used to identify most likely ones of the conflicting media content events that the user would like to have automatically recorded. In such embodiments, the historical viewing habits of the user are stored and then analyzed to identify which media content events the user is watching. When a conflicting media content event is identified as being a media content event of interest based on learning the user's viewing preferences, then the start and end times for the scheduled appointments can be compared with the program presentation times of those identified media content events. If a conflict between the presentation of one of these media content events occurs with one of the scheduled appointments, the conflicting media content event that has been learned to be of interest to the user can be automatically recorded.

For example, the user may repeatedly watch a serial type of media content event on a weekly and/or daily basis. Based on this historical viewing pattern, the calendar synchronization system 100 may learn that the user has a preference for the identified serial type of media content event. Once a preference of a particular serial type of media content event has been learned, information identifying the serial type of media content event is stored in the calendar database 522 or in another suitable memory medium or location. As new calendar schedule information is received, embodiments of the calendar synchronization system 100 compare the received calendar schedule information with the dates and times of the identified serial type of media content events, and an automatic recording can be scheduled if a schedule conflict is identified. For example, the user may consistently watch each episode of a series of a particular media content event. If the appointment information indicates such that the user will unable to use their media device 102 when the next episode airs because of a scheduled appointment, then the next episode can be automatically recorded.

Alternatively, or additionally, embodiments of the calendar synchronization system 100 may receive a media content event recommendation list from another electronic device that may be used to identify recommended media content events that the user might like to have automatically recorded. In such embodiments, the presentation times of the media content events identified in the media content event recommendation list are compared with the start and end times of the scheduled appointments. When a conflicting media content event is identified, that conflicting media content event identified in the media content event recommendation list can be automatically recorded.

In some embodiments of the calendar synchronization system 100, media content events that are similar in subject matter, and/or that have the same actors or other involved individuals, to the media content events of interest identified in the user's favorites list, that are identified during the learning process, and/or that are identified in a media content event recommendation list, are also identified as being media content events of interest. In such embodiments, the presentation times of these related or similar media content events are compared with the start and end times of the scheduled appointments and are automatically recorded if a conflict is identified. When a conflicting related or similar media content event is identified, that conflicting related or similar media content event can be automatically recorded.

Comparison between the scheduled presentation dates and times of identified media content events of interest with defined time periods for the scheduled appointments may be performed periodically, when new appointment information is received from one or more of the electronic devices 104, and/or when updated or new EPG information is received at the media deice 102. Thus, the calendar synchronization system 100 is continually monitoring and comparing scheduled presentation dates and times of identified media content events of interest with the user's scheduled appointments to ensure that one or more automatic operations are performed by the media device 102 as needed when conflicts are identified.

Another exemplary automatic operation performed by embodiments of the calendar synchronization system 100 is presentation of a graphical listing of identified conflicting media content events. Identification of conflicting media content events may be based on media content events that are identified in the user's favorites list, that are identified during the learning process, that are identified in a media content event recommendation list, and/or that are identified as related or similar media content events.

FIG. 7 illustrates an example GUI 702 that may be presented on the display 136 to a user to indicate identified conflicting media content events and an associated conflicting scheduled appointment. The GUI 702 indicates the identified conflicting media content events (Programs A-1, B-1, C-1, C-2) that are in conflict with an exemplary scheduled appointment (on Apr. 8, 2014, from 8:30-10:00 p.m.). The presented identified conflicting media content events may be identified from a larger number of conflicting media content events based on media content events that are identified in the user's favorites list, that are identified during the learning process, that are identified in a media content event recommendation list, and/or that are identified as related or similar media content events. The user specifies media content events for recording by selecting the associated selection boxes for those conflicting media content events shown on the GUI 702.

If the user takes no action, or for those non-selected conflicting media content events shown on the GUI 702, the user will simply miss presentation of those conflicting media content events since they will not be recorded. In such embodiments, the calendar synchronization system 100 stores in the calendar database 522 identifying information the non-selected conflicting media content events indicated to the user on the GUI 702. For example, a flag or other suitable identifier may be saved with a list of non-selected conflicting media content events. When the non-selected conflicting media content events are received at the media device, the identified non-selected conflicting media content events are not recorded. In some embodiments, the identified non-selected conflicting media content events are assigned a lowest possible priority for recording such that they are not recorded while other higher priority media content events are recorded.

Any suitable form of the GUI 702 may be used. Any number of identified conflicting media content events may be listed. If a relatively large number of conflicting media content events are identified, then multiple pages of the GUI 702 may be used to indicate these identified conflicting media content events the user.

The GUI 702 can be presented at various times to the user and/or when one or more predefined events occur. For example, the GUI 702 may be presented after a calendar synchronization occurs at the media device 102 if the user is operating the media device 102 such that media content is being presented on the display 136 (FIG. 5). Alternatively, or additionally, the GUI 702 may be presented when the user initially operates the media device 102. Alternatively, or additionally, the GUI 702 may be presented when the user actuates one or more designated controllers 140 on the remote control 130. Alternatively, or additionally, the GUI 702 may be presented after selection by the user of the prompt or graphical icon 154, a pop-up window, or the like that is presented on the display 136. Alternatively, or additionally, the GUI 702 may be presented when the user initiates presentation of an EPG.

In some embodiments, the user may be notified of identified schedule conflicts with identified media content events that may be of interest to the user. For example, the GUI 702 may be automatically presented to the user at some predefined time that is in advance of the scheduled appointment and/or at the time of the scheduled appointment. Alternatively, an EPG 148 (FIG. 1) with an associated scheduled appointment region 150 may be presented to the user at some predefined time that is in advance of the scheduled appointment and/or at the time of the scheduled appointment. Or, a reminder icon, such as the selectable prompt or graphical icon 154 on the display 136, or another suitable indicator such as a pop up window or the like, may be presented to the user at the predefined time in advance of the scheduled appointment and/or at the time of the scheduled appointment.

Although similar to conventional reminders, a difference is that the above-described indications of a conflict between one or more media content events and a scheduled appointment is that the appointment information is received from an electronic calendar application residing in one or more of the electronic devices 104. Also, the above-described appointment schedule conflict indications identify a plurality of conflicting media content events that have been identified from a larger number of conflicting media content events based on media content events that are identified in the user's favorites list, that are identified during the learning process, that are identified in a media content event recommendation list, and/or that are identified as related or similar media content events.

One skilled in the art appreciates that it is likely that multiple users may reside in a single residence or the like where the media device 102 is located. That is, two or more users may be interested in coordinating their scheduled appointments that they have entered into their electronic calendar applications that reside in one or more of their electronic devices 104. Accordingly, embodiments of the calendar synchronization system 100 are configured to perform calendar synchronizations with a plurality of electronic devices 104 used by multiple users. When embodiments of the calendar synchronization system 100 evaluate potential conflicts between scheduled media content events and a plurality of scheduled appointments for the multiple users, identification of conflicting media content events and/or specification of automatic operations may be presented in a variety of manners by embodiments of the calendar synchronization system 100.

Some embodiments of the calendar synchronization system 100 are configured to identify a particular user that is currently operating the media device. The user may be identified in a variety of manners, such as, but not limited to, specification by the user of their user identifier, specification by the user of an entry of a login code or password for that user, identification of the user by a facial recognition algorithm that recognizes the user, identification of the user by a biometric parameter that identifies the user, identification of the user by a voice recognition algorithm that identifies the user, and/or use of a personal remote control which is used only by that user.

For example, a plurality of users may each have their own personal list of favorite media content events. A first one of the users may identify themselves to the calendar synchronization system 100, and in response, the calendar synchronization system 100 analyzes scheduled appointments for the first single user, and then presents information identifying the conflicting media content events and/or effect other automatic operations for the first user.

Once a particular user is identified, those scheduled appointments associated with the identified user are then analyzed by the calendar synchronization system 100. In an example embodiment, conflicting media content events are identified based on media content events that are identified in the identified user's favorites list, that are identified during the learning process for that particular user, that are identified in a media content event recommendation list for that particular user, and/or that are identified as related or similar media content events preferred by that particular user.

In some situations, one of the multiple users may be absent while one or more of the other users are present. In these situations, embodiments of the calendar synchronization system 100 may analyze scheduled appointments for a selected or specified single user. For example, a first user may want to review potential conflicts for a second user who is away on a trip or the like. Embodiments of the calendar synchronization system 100 are configured to present information identifying the conflicting media content events and/or effect other automatic operations for that particular specified or selected user.

Alternatively, or additionally, multiple users may be concurrently present during operation of the media device. In these situations, embodiments of the calendar synchronization system 100 may analyze scheduled appointments for the multiple users, or selected one of the multiple users, to identify conflicting media content events. For example, a first user and a second user may want to review potential media content event conflicts for their scheduled appointments. Embodiments of the calendar synchronization system 100 are configured to present information identifying the conflicting media content events and/or effect other automatic operations for multiple users.

FIG. 8 illustrates an example GUI 802 that indicates identified conflicting media content events and the identity of the users who are associated with the conflicting media content events. That is, when appointment information for a plurality of users is considered, and schedule conflicts with one or more media content events are identified, then the identity of those users and the conflicting media content events are indicated in the GUI 802. A particular user can be selected on the GUI 802. Then, the calendar synchronization system 100 may present media content events of interest that may be in conflict with the scheduled appointment for the selected user. For example, the GUI 702 (FIG. 7) may be presented for the selected user. Alternatively, an EPG with a scheduled appointment region 150 thereon, such as illustrated in FIG. 2-4 and/or 9, may be presented for the selected user. The selected user, or even another user, may then take appropriate manual action and/or the calendar synchronization system 100 may effect other automatic operations for the times of the scheduled appointment for the selected user.

Alternatively, or additionally, the appointment information for all users may be considered in aggregate. That is, the calendar synchronization system 100 may analyze scheduled appointments for all users, and then present information identifying the conflicting media content events and/or effect other automatic operations for all of the users. In such embodiments, calendar synchronization requests are generated and transmitted to one or more of the electronic devices 104 that are being used by the multiple users. For example, but not limited to, a plurality of calendar synchronization requests are concurrently generated and transmitted to all of the electronic devices 104 that are being used by the multiple users. Alternatively, or additionally, the calendar synchronization requests are generated and transmitted to those electronic devices 104 of an identified user. Alternatively, or additionally, the various electronic devices 104 may communicate schedule synchronization information to the media device 102 when the user enters or modifies a scheduled appointment, or modifies an existing appoint, using the electronic calendar application residing in one or more of their media devices 104.

In some embodiments, conflicts for different users may be indicated differently to so that viewing users may intuitively appreciate which user will be in conflict with scheduled media content events. For example, different shading or fill colors, fill patterns, font types, and/or font colors may be used for scheduled appointment regions on an EPG to differentiate between different users. For example, but not limited to, a blue fill color for scheduled appointment regions 150, 302 (FIG. 3) may be used to identify schedule conflicts for a first user, and a red fill color may be used for another scheduled appointment region 150 to identify schedule conflicts for a second user. Suitable user identifiers, such as a name or the like, may optionally be included on a presented GUI 702.

Another exemplary automatic operation performed by embodiments of the calendar synchronization system 100 is automatically enforcing a parental control limit based on the identity of the user having a scheduled appointment. For example, a first user may be a parent, and other users may be known to be their children. If the parent user is attending a scheduled appointment that requires the parent user to be at a remote location, then parental controls may be automatically enforced during the times of the scheduled appointment, or during a time period that begins before and/or that ends after the times of the scheduled appointment. In this example embodiment, a location of the scheduled appointment is determined from the appointment information received from one or more of the electronic devices 104, wherein the location of the scheduled appointment is remote from the media device 102. Accordingly, a child user is not able to access inappropriate content while the parent user is away attending their scheduled appointment.

Another exemplary automatic operation performed by embodiments of the calendar synchronization system 100 is a power conservation measure. When the user is not able to be present because they are attending a scheduled appointment that requires them to be at a remote location, embodiments of the calendar synchronization system 100 may power down selected components of the media device 102 or another device communicatively coupled to the media device 102, may place the media device 102 or other device into a standby mode, and/or may turn off the media device 102 or other device, during the times of the scheduled appointment, or during a time period that begins before and/or that ends after the times of the scheduled appointment. If multiple users are considered, then the power conservation mode can be made when each of the multiple users are concurrently remote from the media device 102. Here, embodiments of the calendar synchronization system 100 identify concurrent scheduled appointments for the multiple users. Accordingly, power is conserved while a user is away attending their scheduled appointment.

One skilled in the art appreciates that scheduled appointments which require the user to be at a remote location such that the user is not able to use their media device 102 for presentation of media content may require some duration (period of time) for the user to travel to the location of the scheduled appointment and/or to return from the location of the scheduled appointment to the media device 102 location. For example the scheduled appointment may be for a meeting at the user's office. If the user is traveling from the media device 102 location to the location of the scheduled appointment, an amount of travel time may be required for such travel. Alternatively, or additionally, if the user is traveling from the location of the scheduled appointment to the media device 102 location, another amount of travel time may be required for such travel. Further, the travel times may be different from each other, particularly if one of the travel times is during a period of heavy traffic congestion, and/or if one of the travel times is during a period of no traffic congestion.

Embodiments of the calendar synchronization system 100 are configured to adjust the times of one or more of the automatic operations performed by the media device 102 to account for the above-described travel times. These time adjustments which are made to the times of automatic operations are referred to as travel time adjustments. For example, but not limited to, if the user is attending a scheduled meeting appointment that requires the user to be at a remote location, and a half hour is required for travel to and from the meeting, embodiments of the calendar synchronization system 100 may adjust the time periods that begin before and/or that after the times of the conflicting scheduled appointments by the travel time adjustment of a half hour. Thus, if a scheduled appointment is from 8:00 p.m. to 10:00 p.m., automatic operations performed by the media device 102 may be scheduled to begin at 7:30 p.m. and end at 10:30 p.m.

FIG. 9 illustrates an example situation wherein travel time adjustments have been made to the times of the scheduled appointments shown by the presented EPG 148 of FIG. 2. The exemplary travel time adjustments include a one half hour travel time adjustment made to the beginning time of 8:30 p.m. of the example scheduled appointment, and includes a one half hour travel time adjustment made to the ending time of 10:00 p.m. of the example scheduled appointment. Here, the travel time adjustments are shown separately with a first time adjustment region 902 and a second time adjustment region 904 to help the user better appreciate the effect of travel times to and from the example scheduled appointment that begins at 8:30 p.m. and ends at 10:00 p.m.

In some embodiments, the travel time adjustments are automatically made to the scheduled times of scheduled appointments. Thus, the calendar synchronization system 100 performs the analysis to identify any conflicting media content events based on the adjusted times. Alternatively, or additionally, some embodiments may permit the user to specify that the travel time adjustments are to be considered in identifying conflicting media content events. For example, the selection box 906 may be selected by the user to indicate that travel time adjustments are to be made to the scheduled times of scheduled appointments. The selection box 906 may also be used to inform the user whether travel time adjustments have been made to the scheduled times of scheduled appointments.

The times associated with one or more travel time adjustments may be specified by the user in some embodiments. FIG. 10 illustrates an exemplary GUI 1002 that may be presented to the user to facilitate user specification of travel time adjustments that are to be made to the beginning and/or ending times of one or more scheduled appointments. Here, the user may specify durations that are to be added to the beginning and/or ending times of the scheduled appointment times. Alternatively, or additionally, specification of the travel time adjustments may be made by specifying specific times associated with a particular travel time adjustment. The user specifications may be made by the user based on their personal experience, or may be based on an estimation of travel times by the user or determined by another electronic device. Further, the specified travel time adjustments before the start time and after the end time of scheduled appointments may be different.

In the example GUI 1002, a first region 1004 is provided for specification for beginning time adjustments. A second region 1006 is provided for specification for ending time adjustments. The user may enter a duration or a time in the appropriate entry spaces for an associated scheduled appointment.

Alternatively, a "select all" region 1008 is provided such that a fixed duration, here one hour, is added to the beginning and/or ending times of all of the indicated scheduled appointments in response to the user selecting (checking) the associated selection boxes 1010, 1012. For example, if the user selects the selection box 1010, then all of the beginning times of the indicated scheduled appointments will be adjusted by the predefined duration of one hour. Alternatively, if the user selects the selection box 1010, then only the beginning times of the indicated scheduled appointments that have not been specifically specified by the user will be adjusted by the predefined duration of one hour. The selection box 1012 may be configured similarly to the selection box 1010.

In the example GUI 1002, the user has specified that a one hour travel time adjustment is to be made for the beginning time and ending time of the June 10 appointment indicated in the GUI 1002. Here, the user's selection of the selection box associated with the June 10 appointment adjusts the times of the June 10 appointment by the predefined duration of one hour. Accordingly, embodiments of the calendar synchronization system 100 will identify one or more conflicting media content events beginning at 7:00 p.m. and ending at 11:00 p.m. on that date.

As another example, the user has specified that a fifteen minute travel time adjustment is to be made for the beginning time and a one hour travel time adjustment is to be made for the ending time of the June 17 appointment indicated in the GUI 1002. Accordingly, embodiments of the calendar synchronization system 100 will identify one or more conflicting media content events beginning at 7:45 p.m. and ending at 10:00 p.m. on that date. The user may specify the time adjustment information using any suitable user interface device, such as the remote control 130 or a keyboard, mouse, etc.

As another example, the user has specified that a twenty five minute travel time adjustment is to be made for the beginning time by providing information into the associated region 1004 indicated in the GUI 1002. Further, the user has specified that no travel time adjustment is to be made for the ending time of the June 18 appointment by not providing information into the associated region 1006 indicated in the GUI 1002. Accordingly, embodiments of the calendar synchronization system 100 will identify one or more conflicting media content events beginning at 7:35 p.m. and ending at 9:00 p.m. on that date.

As another example, the user may specify a specific time for a travel time adjustment, such as for the ending time of the June 19 appointment indicated in the GUI 1002. Accordingly, embodiments of the calendar synchronization system 100 will identify one or more conflicting media content events beginning at 8:45 p.m. and ending at 10:00 p.m. on that date.

The user has not made any travel time adjustment specifications for the scheduled appointment on June 21. Accordingly, embodiments of the calendar synchronization system 100 will identify one or more conflicting media content events beginning at 9:00 p.m. and ending at 10:00 p.m. on that date.

In some embodiments, a prompt or graphical icon 154, a pop-up window, or the like may be presented on the display 136 to indicate to the user that selection will change presentation to the GUI 1002 which permits the user to specify one or more travel time adjustments. When the user selects the prompt or graphical icon 154, the pop-up window, or the like, the GUI 1002 may then be presented to the user.

Some embodiments of the calendar synchronization system 100 may alternatively, or additionally, be configured to compute durations for the beginning and/or the end durations of the travel time adjustments based on a known or determined location of the scheduled appointments. Here, the known location of the media device 102 and the location of the scheduled appointment are compared to determine a separation distance between the known locations of the media device 102 and the scheduled appointment. Based on the determined separation distance, travel time adjustment durations to account for travel time of the user can be determined there from.

The known location of the media device 102 may be determined from account information, may be specified by the user, or may be specified by another party, such as the service provider or the like. The location of the media device 102 may be specified as an address, as a zip code, and/or as coordinates of a suitable coordinate system, such as by longitude and latitude.

Locations of the scheduled appointments may be determined in a variety of manners. For example, the user may specify the location of the scheduled appointment using an address, zip code, and/or geographic coordinates of a suitable coordinate system, such as by longitude and latitude. Once the location of the scheduled appointment is specified by the user, a separation distance between the known locations of the media device 102 and the scheduled appointment can be determined by the calendar synchronization system 100.

For example, but not limited to, if an address of the scheduled appointment is user specified, a travel route may be determined by the calendar synchronization system 100 or another electronic application, and then the separation distance can be determined based on the determined travel route. Such processes of determining a travel route and an associated separation distance are known to one skilled in the arts.

If the location of the scheduled appointment is not precise, such as if the location of the scheduled appointment is defined by a zip code, an approximate separation distance between the known locations of the media device 102 and the scheduled appointment may be estimated by the calendar synchronization system 100. For example, estimations of the separation distance may be based on a selected location of the region of a known zip code, or may be based on computation of a geographic center of the zip code. Once the geographic location of the zip code is determined, then the separation distance can be calculated there from.

Once the separation distance is determined, the time associated with travel times for known locations of the media device 102 and the scheduled appointment can be determined. In some embodiments, the travel time is calculated by the calendar synchronization system 100 based on a predefined rate of travel, such as in miles or kilometers per hour. The rate of travel may be predefined, may be specified by the user, or may be specified by another party, such as the service provider or the like. The rate of travel is then multiplied by the determined separation distance to determine the durations associated with travel time adjustments.

The rates of travel may be adjustable. In an example embodiment, the rates of travel may be increased if traffic congestion is likely. For example, but not limited to, the rates of travel may be reduced by fifty percent from a predefined value if the travel is to occur during rush hour times. As another example, the rates of travel may be increased by twenty five percent from a predefined value if the travel is to occur during the evening hours and/or during a weekend.

Alternatively, or additionally, the rate of travel may be adjusted depending upon the type of surfaces for the determined path of travel. For example, a thirty mile per hour rate of travel may be assumed if the determined path of travel is over residential surface streets, or fifty miles per hour if the determined path of travel is over highways. A blended rate of travel may be determined if the determined path of travel is over varying types of travel surfaces.

Alternatively, or additionally, rates of travel may be adjusted based on prevailing weather conditions. The rate of travel may be decreased if the adverse prevailing weather conditions exceed a predefined threshold, such as a precipitation threshold, a temperature threshold, and/or a wind speed threshold. For example, but not limited to, the rates of travel may be reduced by fifty percent from a predefined value if the travel is to occur during the winter and/or during a blizzard or a rain storm.

Locations of a scheduled appointment may be inferred by embodiments of the calendar synchronization system 100 based on other available information. For example, the supplemental information in the received appointment information may indicate an address of the scheduled appointment from which the location can be determined there from. The calendar synchronization system 100 may be configured to perform a key word search on the text string of the supplemental information, and then be configured to recognize the name of streets, recognize likely address numbers and/or recognize a zip code.

In some embodiments, information from an address book, telephone book or the like may be retrieved or accessed by the calendar synchronization system 100 to aid in the identification of an address of the scheduled appointment. Here, the text string of the received supplemental information may be compared with the information from the address book, telephone book or the like. A match between an identified portion of the text string of the received supplemental information and the address book, telephone book or the like would be used to define the location of the scheduled appointment.

Alternatively, or additionally, locations of a scheduled appointment may be inferred by embodiments of the calendar synchronization system 100 based on the names of other participants who are to be at the scheduled appointment and/or the name of a business where the scheduled appointment is to be held. For example, a name of a person or a business may be associated with an address from which the location can be determined there from. The calendar synchronization system 100 may be configured to perform a key word search on the text string to recognize the names, and then be configured to use an address book, telephone book or the like to aid in the identification of an address that matches with the name of the person and/or business in a contact list or other information list associated with the person or business. Alternatively, or additionally, the name/address information may reside in the memory 506 of the media device. In some embodiments, the name and address information may be saved at the electronic device 104, which then includes the information in the provided appointment information.

In some embodiments, the calendar synchronization system 100 may be able to use the browser 524 (FIG. 5) to determine an address of the location of the scheduled appointment based on an address associated with the Internet information returned to the browser 524 of the media device 102. For example, the calendar synchronization system 100 may establish a connection from the media device 102 to the Internet. Using the browser 524 of the media device 102, the calendar synchronization system 100 may search for at least one of a name of another person attending the scheduled appointment, a name of a business where the scheduled appointment is to be held, a phone number of another person attending the scheduled appointment, and a phone number of a business where the scheduled appointment is to be held. The Internet search results may be then used to obtain the address or location of the scheduled appointment.

In some embodiments, the calendar synchronization system 100 may analyze supplemental information describing characteristics about the nature of a scheduled appointment. For example, if the nature of the scheduled appointment is characterized as a telephone call, then the calendar synchronization system 100 may determine that little or no travel time will be associated with the user attending the scheduled appointment. In contrast, if the scheduled appointment is characterized as a meeting, then the calendar synchronization system 100 may determine that some amount of travel time will be associated with the user attending the scheduled appointment. Accordingly, a travel time adjustment determination process as disclosed above may then be performed by embodiments of the calendar synchronization system 100.

As another example, if the scheduled appointment is characterized as a meeting of a particular type, then the calendar synchronization system 100 may determine whether the scheduled appointment is likely to end at the scheduled ending time. For example, the scheduled appointment may be for a school play that is likely to end at the scheduled time. In contrast, the scheduled appointment may be for a cocktail party, birthday party, sporting event, or other social event that may or may not end at the scheduled time. Accordingly, the calendar synchronization system 100 may add a predefined time adjustment to the indicated ending time of the scheduled appointment. The predefined time adjustment may be based on a particular type of event characteristic. The calendar synchronization system 100 may be configured to perform a key word search on the text string to recognize the characteristic, and then use a look up table or the like populated with various durations and associated event characteristics. For example, a half hour time adjustment may be added if the characteristic indicates that the scheduled appointment is for a sporting event, such as a football or baseball game. As another non-limiting example, a two hour time adjustment may be added in the event is a evening cocktail party or a dinner at a restaurant.

It should be emphasized that the above-described embodiments of the calendar synchronization system 100 are merely possible examples of implementations of the invention. Many variations and modifications may be made to the above-described embodiments. All such modifications and variations are intended to be included herein within the scope of this disclosure and protected by the following claims.

The invention claimed is:

1. A media device, comprising:
  a communication system interface that receives appointment information from an electronic device, wherein the appointment information is defined by a time period for a scheduled appointment for a user;
  a media content stream interface configured to receive a broadcasting media content stream;
  a digital video recorder (DVR) that is configured to record a plurality of media content events that are received in the broadcasting media content stream; and
  a processor system that:
    compares the time period for the scheduled appointment with a plurality of media content event presentation times;
    automatically identifies a plurality of media content events having presentation times at least partially overlapping the time period for the scheduled appointment;
    automatically modifies presentation of an electronic program guide (EPG) to indicate the time period of the scheduled appointment using a scheduled appointment region that overlays media content event information of the presented modified EPG, wherein the scheduled appointment region presented on the modified EPG indicates at least a start time of the scheduled appointment and an end time of the scheduled appointment;
    automatically modifies presentation of the EPG to indicate an adjustment to the end time of the scheduled appointment using an end time adjustment region that overlays the media content event information; and
    automatically modifies presentation of the EPG to indicate a time period of a second scheduled appointment for a second user using a second appointment region that overlays the media content event information, wherein the second appointment region has a different appearance than the scheduled appointment region.

2. The media device of claim 1, wherein the processor system automatically identifies a media content event that will be received at the media device during the time period of the scheduled appointment from the plurality of identified media content events based on a priority associated with each one of the plurality of media content events.

3. The media device of claim 2, wherein the processor system automatically records the identified media content event in the DVR.

4. The media device of claim 2, wherein the processor system determines whether there is sufficient capacity of the DVR to record the identified media content event and a second media content event into the DVR, wherein all of the second media content event is recorded only when there is sufficient capacity in the DVR to record both the identified media content event and the second media content event.

5. The media device of claim 4, wherein the broadcasting media content stream is one of a plurality of broadcasting media content streams, wherein the processor system determines whether there is availability of at least a first tuner of the media device to receive the identified media content event being received in a first one of the plurality of broadcasting media content streams and a second tuner of the media device to receive the second media content event being received in a second one of the plurality of broadcasting media content streams, wherein the second media content event is recorded only when the second tuner is available to receive the second one of the plurality of broadcasting media content streams that has the second media content event.

6. The media device of claim 1, wherein the plurality of media content events are identified with a learning process and wherein the learning process comprises:
  monitoring media content event viewing by the user;
  identifying a plurality of media content events that are preferred by the user based on the monitoring; and
  identifying the first media content event from the plurality of identified media content events that are preferred by the user.

7. The media device of claim 1, wherein the processor system:
  communicates a calendar synchronization request from the media device to the electronic device,
  wherein the calendar synchronization request identifies the user and a time period that is presented by the modified EPG,
  wherein the electronic device has the appointment information that describes the user's scheduled appointment, and
  wherein the electronic device returns the appointment information to the media device in response to receiving the calendar synchronization request and only when at least one of a start time and an end time of the appointment information falls within the time period that is presented by the modified EPG.

8. A media device, comprising:
  a communication system interface that receives appointment information from an electronic device, wherein the appointment information is defined by a time period for a scheduled appointment for a user;
  a media content stream interface configured to receive a broadcasting media content stream;
  a digital video recorder (DVR) that is configured to record a plurality of media content events that are received in the broadcasting media content stream; and
  a processor system that:
    compares the time period for the scheduled appointment with a plurality of media content event presentation times;
    automatically identifies a plurality of media content events having presentation times at least partially overlapping the time period for the scheduled appointment;
    automatically modifies presentation of an electronic program guide (EPG) to indicate the time period of the scheduled appointment using a scheduled appointment region that overlays media content event information of the presented modified EPG, wherein the scheduled appointment region presented on the modified EPG indicates at least a start time of the scheduled appointment and an end time of the scheduled appointment;
    automatically modifies presentation of the EPG to indicate an adjustment to the end time of the scheduled appointment using an end time adjustment region that overlays the media content event information; and
    automatically modifies presentation of the EPG to indicate a time period of a second scheduled appointment for a second user using a second appointment region that overlays the media content event information, wherein the second appointment region has a different appearance than the scheduled appointment region.

9. The media device of claim 8, wherein the plurality of media content events have been identified based on a learning process comprising:
  monitoring media content event viewing by the user;
  identifying a plurality of media content events that are preferred by the user based on the monitoring; and
  identifying the first media content event from the plurality of identified media content events that are preferred by the user.

10. The media device of claim 8, wherein the plurality of media content events have been identified based on a user's favorites list.

11. The media device of claim 8, wherein the processor system automatically identifies a second media content event that will be received at the media device during the time period of the scheduled appointment from the plurality of identified media content events based on a priority associated with each one of the plurality of media content events.

12. A method, comprising:
  receiving appointment information at a media device from an electronic device, wherein the appointment information identifies a time period for a scheduled appointment for a user;
  comparing the time period for the scheduled appointment with a plurality of media content event presentation times;
  automatically identifying a plurality of media content events having presentation times at least partially overlapping the time period for the scheduled appointment;
  automatically modifying presentation of an electronic program guide (EPG) to indicate the time period of the scheduled appointment using a scheduled appointment region that overlays media content event information of the presented modified EPG, wherein the scheduled appointment region presented on the modified EPG indicates at least a start time of the scheduled appointment and an end time of the scheduled appointment;
  automatically modifying presentation of the EPG to indicate an adjustment to the end time of the scheduled appointment using an end time adjustment region that overlays the media content event information; and
  automatically modifies presentation of the EPG to indicate a time period of a second scheduled appointment for a second user using a second appointment region that overlays the media content event information, wherein the second appointment region has a different appearance than the scheduled appointment region.

13. The method of claim 12, further comprising automatically identifying a media content event that will be received at the media device during the time period of the scheduled appointment from the plurality of identified media content events based on a priority associated with each one of the plurality of media content events.

14. The method of claim 13, further comprising determining whether there is sufficient capacity of the DVR to record the identified media content event and a second media content event into the DVR, wherein all of the second media content event is recorded only when there is sufficient capacity in the DVR to record both the first media content event and the second media content event.

15. The method of claim 14, further comprising determining availability of at least a first tuner of the media device to receive the identified media content event and a second tuner to receive the second media content event, wherein all of the second media content event is recorded only when the second tuner is available to receive the second media content event.

16. The method of claim 12, further comprising:
communicating a calendar synchronization request from the media device to the electronic device,
wherein the calendar synchronization request identifies the user and a time period that is presented by the modified EPG,
wherein the electronic device has the appointment information that describes the user's scheduled appointment, and
returning the appointment information to the media device in response to receiving the calendar synchronization request and only when at least one of a start time and an end time of the appointment information falls within the time period that is presented by the modified EPG.

17. The method of claim 12, wherein the plurality of media content events are identified with a learning process and wherein the learning process comprises:
monitoring media content event viewing by the user;
identifying a plurality of media content events that are preferred by the user based on the monitoring; and
identifying the first media content event from the plurality of identified media content events that are preferred by the user.

* * * * *